United States Patent
Shin et al.

(10) Patent No.: US 10,666,462 B2
(45) Date of Patent: May 26, 2020

(54) QUANTUM SYSTEM PERFORMING QUANTUM CHANNEL ESTIMATION AND METHOD OF MODELING QUANTUM CHANNEL

(71) Applicant: University-Industry Cooperation Group of Kyung-Hee University, Yongin-si, Gyeonggi-do (KR)

(72) Inventors: Hyundong Shin, Yongin-si (KR); Youngmin Jeong, Seongnam-si (KR)

(73) Assignee: University-Industry Cooperation Group of Kyung-Hee University, Yongin-si (KR)

( * ) Notice: Subject to any disclaimer, the term of this patent is extended or adjusted under 35 U.S.C. 154(b) by 0 days.

(21) Appl. No.: 15/900,983

(22) Filed: Feb. 21, 2018

(65) Prior Publication Data
US 2019/0074997 A1    Mar. 7, 2019

(30) Foreign Application Priority Data

Sep. 6, 2017 (KR) .................. 10-2017-0113985

(51) Int. Cl.
*H04L 25/02* (2006.01)
*H04B 1/38* (2015.01)
(Continued)

(52) U.S. Cl.
CPC ........ *H04L 25/024* (2013.01); *H04L 25/0204* (2013.01); *H04L 25/0272* (2013.01);
(Continued)

(58) Field of Classification Search
None
See application file for complete search history.

(56) References Cited

U.S. PATENT DOCUMENTS

2004/0109564 A1* 6/2004 Cerf .................. H04L 9/0858
380/256
2008/0292099 A1* 11/2008 Gisin .................. H04L 9/0858
380/29
(Continued)

FOREIGN PATENT DOCUMENTS

KR    10-2016-0079924 A    7/2016
WO    2013/036741 A2       3/2013

OTHER PUBLICATIONS

Laszlo Gyongyosi; "The Structure and Quantum Capacity of a Partially Degradable Quantum Channel"; IEEE Access; pp. 333-355; vol. 2; 2014.

(Continued)

*Primary Examiner* — Donald L Mills
(74) *Attorney, Agent, or Firm* — Studebaker & Brackett PC

(57) ABSTRACT

Disclosed herein is a method of performing quantum channel estimation. The method is performed by a first device of a transmission device, and may include a first quantum state transmission step of transmitting a first quantum state ρ including an N-qubit sequence to a second device of a reception device through a quantum channel, a second quantum state information reception step of receiving information about a second quantum state Φ(ρ) received by the second device through the quantum channel from the second device, and a quantum channel estimation step of estimating the quantum channel based on the received information about the second quantum state Φ(ρ).

20 Claims, 19 Drawing Sheets

(51) Int. Cl.
    *G06N 10/00*     (2019.01)
    *H04L 25/49*     (2006.01)
    *G06N 7/00*     (2006.01)

(52) U.S. Cl.
    CPC .............. *G06N 7/005* (2013.01); *G06N 10/00* (2019.01); *H04B 1/38* (2013.01); *H04L 25/0298* (2013.01); *H04L 25/4908* (2013.01)

(56) References Cited

U.S. PATENT DOCUMENTS

2016/0241396 A1\*   8/2016   Fu .......................... H04L 9/0858
2017/0033926 A1\*   2/2017   Fu .......................... H04L 9/0852

\* cited by examiner (a) Memoryless channel (b) Fully correlated channel (a) Concurrence  (b) Discord (a) Concurrence (b) Discord (a) Concurrence (b) Success probability

QUANTUM SYSTEM PERFORMING QUANTUM CHANNEL ESTIMATION AND METHOD OF MODELING QUANTUM CHANNEL

CROSS REFERENCE TO RELATED APPLICATION

The present application claims the benefit of Korean Patent Application No. 10-2017-0113985 filed in the Korean Intellectual Property Office on Sep. 6, 2017, the entire contents of which are incorporated herein by reference.

BACKGROUND OF THE INVENTION

1. Technical Field

The present invention relates to a method and system for converting a quantum channel and, more particularly, to a method of selecting any one of a plurality of channels in a quantum network and a quantum transceiver performing the method.

2. Description of the Related Art

A quantum correlation is an important resource for various potential application of quantum information science. The most widely used quantum correlation is quantum entanglement, which may be used for a quantum key quantum scheme. Furthermore, quantum discord, that is, a quantum correlation of a common concept defined as a difference between inter-quantum information about a dichotomy quantum state and a common correlation, has been introduced.

Unlike quantum entanglement, the quantum discord has an advantage in that a quantum correlation can be described with respect to a specific separable mixing state.

Furthermore, non-localities related to such a quantum state has a problem in that they may easily become vulnerable by an interaction with an environment. That is, non-localities have a problem in that they may easily become vulnerable by quantum noise or decoherence. Accordingly, in quantum communication and security, accurate estimation of a quantum channel over time is required.

SUMMARY OF THE INVENTION

Accordingly, the present invention has been made keeping in mind the above problems occurring in the prior art, and an object of the present invention is to provide an accurate method of estimating a quantum channel according to a change of time.

Another object of the present invention is to provide an optimal quantum channel estimation method according to several parameters for a quantum state in order to provide an accurate method of estimating a quantum channel according to a change of time.

An embodiment of the present invention may provide a method of performing quantum channel estimation. The method may be performed by a first device of a transmission device, and may include a first quantum state transmission step of transmitting a first quantum state p including an N-qubit sequence to a second device of a reception device through a quantum channel, a second quantum state information reception step of receiving information about a second quantum state $\Phi(\rho)$ received by the second device through the quantum channel from the second device, and a quantum channel estimation step of estimating the quantum channel based on the received information about the second quantum state $\Phi(\rho)$.

In one embodiment, the second quantum state $\Phi(\rho)$ is determined to be $$\Phi(\rho) = (1-\mu)\sum_{i,j} A_{ij}^u \rho A_{ij}^{u\dagger} + \mu \sum_k A_k^c \rho A_k^{c\dagger}.$$

In this case, $A_{ij}^u = A_i \otimes A_j$ may be a first Kraus operator not having a correlation and $A_k^c$ may be a second Kraus operator having a correlation. The quantum channel estimation step may include estimating the second Kraus operator.

In one embodiment, the quantum channel estimation step may include a step of performing quantum discord operation on the second quantum state $\Phi(\rho)$ according to a change of time, a channel type determination step of determining whether the quantum channel corresponds to any one of a phase damping channel, an amplitude damping channel, and a thermal field channel having specific channel memory based on the quantum discord, and a second Kraus operator estimation step of estimating the second Kraus operator using a different method depending on the determined channel.

In one embodiment, the quantum channel estimation step may include a weak measurement (WM) and quantum measurement reversal (QMR) execution step of performing at least one of WM and QMR on the second quantum state $\Phi(\rho)$ and a second Kraus operator estimation step of estimating the second Kraus operator based on the concurrence of the second quantum state $\Phi(\rho)$ according to measurement strength associated with the WM/QMR and a change of time.

In one embodiment, the quantum channel estimation step may further include a channel memory/decoherence analysis step of analyzing a channel memory and decoherence effect between the two consecutive uses of the channel derived by a time-correlated Markov quantum channel (TCMQC).

In one embodiment, the method may further include a channel parameter transfer step of transferring a parameter for the second Kraus operator to the second device based on the estimated quantum channel. The second device may estimate the N-qubit sequence based on the parameter for the second Kraus operator and the second quantum state $\Phi(\rho)$.

In another aspect of the present invention, there is provided a method of performing quantum channel estimation. The method may be performed by a second device of a reception device, and may include a first quantum state reception step of receiving a first quantum state p including an N-qubit sequence from a first device of a transmission device through a quantum channel. In this case, the first quantum state p is received as a second quantum state $\Phi(\rho)$ through the quantum channel and a quantum channel estimation step of estimating the quantum channel based on the received second quantum state $\Phi(\rho)$.

In one embodiment, the second quantum state $\Phi(\rho)$ is determined to be $$\Phi(\rho) = (1-\mu)\sum_{i,j} A_{ij}^u \rho A_{ij}^{u\dagger} + \mu \sum_k A_k^c \rho A_k^{c\dagger}.$$

In this case, $A_{ij}^u = A_i \otimes A_j$ may be a first Kraus operator not having a correlation and $A_k^c$ may be a second Kraus operator having a correlation. The quantum channel estimation step includes estimating the second Kraus operator.

In one embodiment, the quantum channel estimation step may include a step of performing quantum discord operation on the second quantum state $\Phi(\rho)$ according to a change of time, a channel type determination step of determining whether the quantum channel corresponds to any one of a phase damping channel, an amplitude damping channel, and a thermal field channel having specific channel memory based on the quantum discord, and a second Kraus operator estimation step of estimating the second Kraus operator using a different method depending on the determined channel.

In one embodiment, the quantum channel estimation step may include a weak measurement (WM) and quantum measurement reversal (QMR) execution step of performing at least one of WM and QMR on the second quantum state $\Phi(\rho)$ and a second Kraus operator estimation step of estimating the second Kraus operator based on the concurrence of the second quantum state $\Phi(\rho)$ according to measurement strength associated with the WM/QMR and a change of time.

In one embodiment, the quantum channel estimation step may further include a channel memory/decoherence analysis step of analyzing a channel memory and decoherence effect between the two consecutive uses of the channel derived by a time-correlated Markov quantum channel (TCMQC).

In one embodiment, the method may further include the steps of a qubit sequence estimation step of estimating the N-qubit sequence based on a parameter for the second Kraus operator and the second quantum state $\Phi(\rho)$ and a channel parameter transfer step of transferring the parameter for the second Kraus operator to the first device based on the estimated quantum channel.

In yet another aspect of the present invention, a quantum transmission device performing quantum channel estimation includes a transceiver configured to transmit a first quantum state $\rho$ including an N-qubit sequence to a second device of a reception device through a quantum channel and receive information about a second quantum state $\Phi(\rho)$ received by the second device through the quantum channel from the second device and a controller configured to estimate the quantum channel based on the received information about the second quantum state $\Phi(\rho)$.

In one embodiment, the second quantum state $\Phi(\rho)$ is determined to be $$\Phi(\rho) = (1-\mu) \sum_{i,j} A_{ij}^u \rho A_{ij}^{u\dagger} + \mu \sum_k A_k^c \rho A_k^{c\dagger}.$$

In this case, $A_{ij}^u = A_i \otimes A_j$ may be a first Kraus operator not having a correlation and $A_k^c$ may be a second Kraus operator having a correlation. The quantum channel estimation step may include estimating the second Kraus operator.

In one embodiment, the controller may be configured to perform quantum discord operation on the second quantum state $\Phi(\rho)$ according to a change of time, determine whether the quantum channel corresponds to any one of a phase damping channel, an amplitude damping channel, and a thermal field channel having specific channel memory based on the quantum discord, and estimate the second Kraus operator using a different method depending on the determined channel.

In yet another aspect of the present invention, a quantum reception device performing quantum channel estimation includes a transceiver configured to receive a first quantum state $\rho$ including an N-qubit sequence from a first device of a transmission device through a quantum channel. In this case, the first quantum state $\rho$ is received as a second quantum state $\Phi(\rho)$ through the quantum channel and a controller configured to estimate the quantum channel based on the received second quantum state $\Phi(\rho)$.

In one embodiment, the second quantum state $\Phi(\rho)$ is determined to be $$\Phi(\rho) = (1-\mu) \sum_{i,j} A_{ij}^u \rho A_{ij}^{u\dagger} + \mu \sum_k A_k^c \rho A_k^{c\dagger}.$$

In this case, $A_{ij}^u = A_i \otimes A_j$ may be a first Kraus operator not having a correlation and $A_k^c$ may be a second Kraus operator having a correlation. The controller may be configured to estimate the second Kraus operator.

In one embodiment, the controller may be configured to analyze a channel memory and decoherence effect between the two consecutive uses of the channel derived by a time-correlated Markov quantum channel (TCMQC).

In one embodiment, the controller may be configured to estimate the N-qubit sequence based on a parameter for the second Kraus operator and the second quantum state $\Phi(\rho)$ and transfer the parameter for the second Kraus operator to the first device based on the estimated quantum channel.

BRIEF DESCRIPTION OF THE DRAWINGS

FIG. 5 shows concurrence according to a change of $\beta$ and t in $(1, \beta, -1, 0.2)$. FIG. 6 shows concurrence according to a change of $\mu$ and t in $(1, 1, -1, \mu)$. FIG. 7 shows concurrence according to a change of $\mu$ and t in $(0, 2, 0\mu)$. FIG. 8 shows concurrence according to a change of $\mu$ and $\omega$ in $(1, 0.5, \omega\mu)$.

FIG. 10 shows quantum discord as the function of t in $(1, \beta, -1, 0.2)$ with respect to different $\beta$. FIG. 11 shows quantum discord as the function of t in $(1, 1, -1, \mu)$ with respect to different $\mu$. FIG. 12 shows quantum discord as the function of t in $(0, 2\ 0, \mu)$ with respect to different $\mu$. In contrast, FIG. 13 shows quantum discord as the function of $\omega$ in $(1, 0.5, \omega, \mu)$ with respect to different $\mu$.

DETAILED DESCRIPTION

Figure 1:
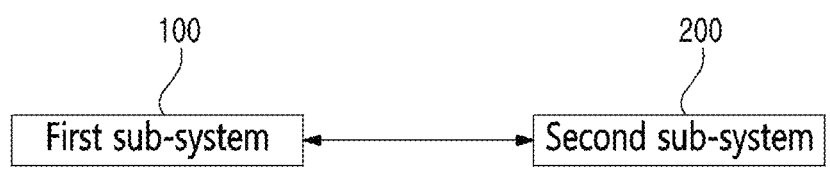
FIG. 1 shows a quantum system performing a quantum channel estimation method according to an embodiment of the present invention.

The above characteristics and effects of the present invention will become more evident from the following detailed description related to the accompanying drawings. Accordingly, a person having ordinary knowledge in the art to which the present invention pertains may readily practice the technical spirit of the present invention. The present invention may be changed in various ways and may have several embodiments. Specific embodiments are illustrated in the drawings and are described in detail. It is however to be understood that the present invention is not intended to be limited to specific disclosure forms and the present invention includes all changes, equivalents and substitutions which fall within the spirit and technological scope of the present invention. Terms used in this specification are merely used to describe specific embodiments and are not intended to limit the present invention.

Similar reference numerals are used for similar elements while each drawing is described.

Terms, such as the first and the second, may be used to describe various elements, but the elements should not be restricted by the terms. The terms are used to only distinguish one element from the other element.

For example, a first element may be named a second element without departing from the range of right of the present invention. Likewise, a second element may be named a first element. The term "and/or" includes a combination of a plurality of related and illustrated items or any one of a plurality of related and described items.

Unless defined otherwise, all terms used herein, including technological terms or scientific terms, have the same meanings as those generally understood by persons of ordinary skill in the technological field to which the present invention pertains.

The terms, such as terms that are generally used and defined in dictionaries, should be construed as having meanings identical to those that are used in the context of related technology, and should not be construed as having ideal or excessively formal meanings unless explicitly defined otherwise.

It is to be noted that the suffixes of elements used in the following description, such as a "module", a "block" and a "unit", are assigned or interchangeable with each other by taking into consideration only the ease of writing this specification, but in themselves are not particularly given distinct meanings and roles.

Hereinafter, embodiments of the present invention are described in detail so that a person having ordinary knowledge in the art may easily practice the embodiments with reference to the accompanying drawings. In describing the embodiments of the present invention, a detailed description of a related function or construction will be omitted if it is deemed that such description would make the gist of the present invention unnecessarily vague.

Hereinafter, a quantum channel estimation method and quantum channel estimation system according to embodiments of the present invention are described below.

FIG. 1 shows a quantum system performing a quantum channel estimation method according to an embodiment of the present invention. As shown in FIG. 1, the quantum system includes a plurality of sub-systems, and may be expressed as including a first sub-system 100 and a second sub-system 200, for convenience sake. However, the quantum system is not limited to the first and the second sub-systems 100 and 200 only, and may be applied between a specific number of sub-systems. The first and the second sub-systems 100 and 200 may be specific quantum devices. That is, the first and the second sub-systems 100 and 200 may be a first (quantum) device, that is, a transmission device, and a second (quantum) device, that is, a reception device. If any one of the first (quantum) device 100 and the second (quantum) device 200 is a transmission device, the other of them may be a reception device. The first (quantum) device 100 may be a control station (or base station) that controls a plurality of the second (quantum) devices 200.

Figure 2:
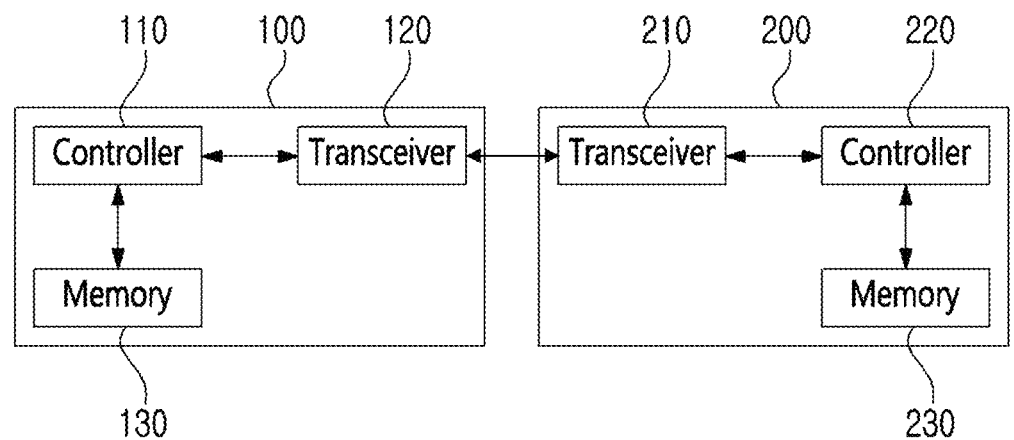
FIG. 2 is a detailed block diagram of a quantum device according to an embodiment of the present invention.
Figure 3:
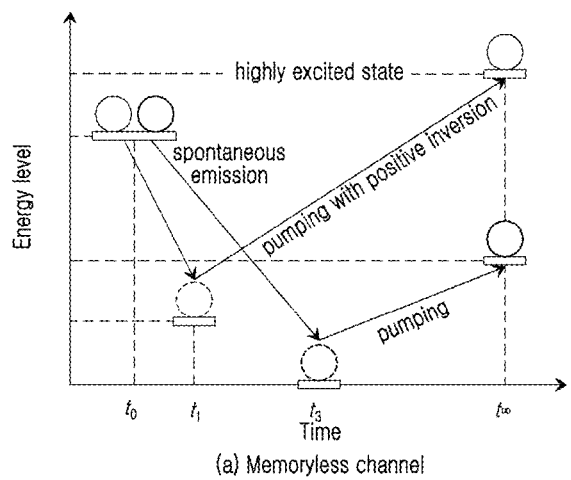
FIG. 3 shows the evolution of two qubits in a time-correlated Markov quantum channel (TCMQC) for (a) a memoryless channel and (b) a fully correlated channel according to an embodiment of the present invention.
Figure 3:
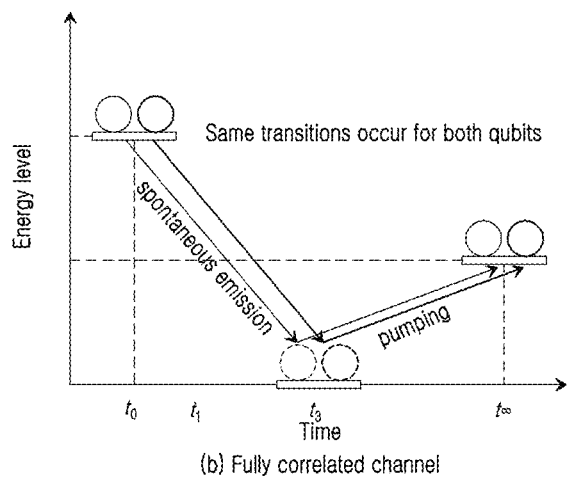

FIG. 2 is a detailed block diagram of the quantum device according to an embodiment of the present invention. For convenience sake, a transmission device may be called the first device 100, and a reception device may be called the second device 200. However, the present invention is not limited thereto, and the vice versa. Furthermore, the quantum device may also operate as a transceiver device.

The first device 100 includes a controller 110, a transceiver 120 and memory 130. Likewise, the second device 200 includes a controller 210, a transceiver 220 and memory 230. In this case, the transceiver 120, 220 may be called a quantum transceiver because it transmits or receives quantum data through a quantum channel. Furthermore, the transceiver 120, 220 may also be called a classical transceiver because it may transmit or receive some control data or related information through a classical channel. That is, the transceiver 120, 220 may include a quantum transceiver and classical transceiver that are physically separated or may include a quantum transceiver and classical transceiver that are logically separated. Accordingly, the transceiver 120 is configured to transmit quantum information to the second device, that is, the reception device 200, through a classical channel and a quantum channel. In this case, the quantum information includes information about a state (e.g., a quantum state). Furthermore, the transceiver 120 may receive feedback information (e.g., quantum channel information or correlation feedback) from the second device 200 through the classical channel.

The transceiver 120 is configured to transmit a first quantum state ρ including an N-qubit sequence to the second device, that is, the reception device, through the quantum channel and to receive information about a second quantum state Φ(ρ), received by the second device through the quantum channel, from the second device.

The controller 110 is configured to estimate the quantum channel based on information about the received second quantum state Φ(ρ). The second quantum state Φ(ρ) is determined to be $$\Phi(\rho) = (1-\mu)\sum_{i,j} A_{ij}^u \rho A_{ij}^{u\dagger} + \mu \sum_k A_k^c \rho A_k^{c\dagger}.$$

In this case, $A_{ij}^u = A_i \otimes A_j$ is a first Kraus operator not having a correlation, and $A_k^c$ is a second Kraus operator having a correlation. The controller 110 may estimate the aforementioned second Kraus operator.

Furthermore, the controller 110 performs quantum discord operation on the second quantum state $\Phi(\rho)$ according to a change of time, and may determine whether the quantum channel correspond to any one of a phase damping channel, an amplitude damping channel, and a thermal field channel having specific channel memory based on the quantum discord. Furthermore, the controller 110 may estimate the second Kraus operator using a different method depending on the determined channel.

Furthermore, the controller 110 may perform at least one of weak measurement (WM) and quantum measurement reversal (QMR) on the second quantum state $\Phi(\rho)$. Furthermore, the controller 110 may estimate the second Kraus operator based on the concurrence of the second quantum state $\Phi(\rho)$ according to measurement strength associated with the WM/QMR and a change of time.

Furthermore, the controller 110 may analyze a channel memory and decoherence effect between the two consecutive uses of the channel derived by a time-correlated Markov quantum channel (TCMQC).

The memory 130 may be configured to store quantum information and common information in relation to quantum channel estimation and state transmission.

An operation performed by the second device 200, that is, a reception device, is described below.

The transceiver 220 is configured to receive the first quantum state $\rho$, including an N-qubit sequence, from the first device, that is, a transmission device, through the quantum channel. In this case, the first quantum state $\rho$ may be received as the second quantum state $\Phi(\rho)$ by the transceiver 220 through the quantum channel. The N-qubit sequence may be a training sequence known to the second device 200 or unknown quantum data.

The controller 210 may be configured to estimate the quantum channel based on the received second quantum state $\Phi(\rho)$. The quantum channel estimation, as described above, may be performed by the controller 120 of the first device 100, but may be performed by the controller 210 of the second device 200. In accordance with an embodiment of the present invention, if the N-qubit sequence is a training sequence known to the second device 200, the quantum channel estimation may be performed by the controller 210 of the second device 200. Furthermore, although the N-qubit sequence is unknown quantum data, the controller 210 may perform the quantum channel estimation using the state information from the first device 100 and a blind estimation method. The second quantum state $\Phi(\rho)$ is determined to be $$\Phi(\rho) = (1-\mu)\sum_{i,j} A_{ij}^u \rho A_{ij}^{u\dagger} + \mu \sum_k A_k^c \rho A_k^{c\dagger}.$$

In this case, $A_{ij}^u = A_i \otimes A_j$ is a first Kraus operator not having a correlation, and $A_k^c$ is a second Kraus operator having a correlation. In this case, the controller 210 estimates the second Kraus operator.

Furthermore, the controller 210 may perform quantum discord operation on the second quantum state $\Phi(\rho)$ according to a change of time. Accordingly, the controller 210 may determine that the quantum channel corresponds to any one of a phase damping channel, an amplitude damping channel, and a thermal field channel having specific channel memory based on the quantum discord. Furthermore, the controller 210 may estimate the second Kraus operator using a different method depending on the determined channel.

Furthermore, the controller 210 may perform at least one of weak measurement (WM) and quantum measurement reversal (QMR) on the second quantum state $\Phi(\rho)$. Furthermore, the controller 210 may estimate the second Kraus operator based on the concurrence of the second quantum state $\Phi(\rho)$ according to measurement strength associated with the WM/QMR and a change of time.

Furthermore, the controller 210 may analyze a channel memory and decoherence effect between the two consecutive uses of the channel derived by a time-correlated Markov quantum channel (TCMQC).

Furthermore, the controller 210 may estimate the N-qubit sequence based on a parameter for the second Kraus operator and the second quantum state $\Phi(\rho)$. Accordingly, the transceiver 220 may transfer the parameter for the second Kraus operator to the first device 100 based on the estimated quantum channel.

In relation to the aforementioned quantum channel estimation system, a series of procedures related to a detailed operation in the quantum transmission/reception device according to an embodiment of the present invention is described in detail below. Time-correlated Markov quantum channels are described below.

A. Markov quantum channel is described below.

In relation to quantum channel estimation and corresponding quantum state transmission/reception according to an embodiment of the present invention, the quantum channel may be defined by a stochastic map as in Equation 1.

$$\Phi : \rho \rightarrow \Phi(\rho) \tag{1}$$

In Equation 1, the quantum state ($\rho$) is converted into a quantum state described by a density operator $\Phi(\rho)$, and may satisfy a positive property $\Phi(\rho) > 0$ and trace preserving properties $tr(\Phi(\rho)) = 1$. In the master equation theory, the stochastic map $\Phi$ describes that the density operator $\rho$ satisfies a master equation of a structure according to Equation 2.

$$\frac{d\rho}{dt} = -\frac{i}{\hbar}[H, \rho] + \mathcal{L}\rho \tag{2}$$

In Equation 2, the first part of Equation 2 describes a unitary (coherent) evolution related to a commutator and has system Hamiltonian H [.,.] for an interaction with an undamped system. In contrast, the second part of Equation 2 describes non-unitary evolution that describes a decay system. The non-unitary evolution part may be expressed as in Equation 3 in an Lindblad form.

$$\mathcal{L}\rho = \sum_{j=1}^{d-1} 2L_j \rho L_j^\dagger - \{L_j^\dagger L_j, \rho\} \tag{3}$$

In Equation 3, the Lindblad form is valid for a d-dimension hilbert space. In this case, Lj is an Lindblad operator indicative of coupling between its own environment and the system, and {.,.} indicates an anti-commutator.

In a 2-dimension hilbert space, a specific Lindblad operator may be expressed as in Equation 4 with respect to a 2-level atom.

$$L_1 = \sigma, L_2 = \sigma^\dagger, L_3 = \frac{\sigma_z}{\sqrt{2}} \quad (4)$$

In Equation 4, and $\sigma^\dagger = \frac{1}{2}(\sigma_x + \kappa \sigma_y)$ and are creation and annihilation operators, and $\sigma x$, $\sigma y$, and $\sigma z$ are Pauli matrices. The non-unitary evolution part in Equation 3 has a form, such as Equation 5.

$$\mathcal{L}\rho(\alpha, \beta, w) = -\frac{\alpha}{4}(1-w)(\sigma^\dagger \sigma \rho + \rho \sigma^\dagger \sigma - 2\sigma \rho \sigma^\dagger) - \quad (5)$$

$$\frac{\alpha}{4}(1+w)(\sigma \sigma^\dagger \rho + \rho \sigma \sigma^\dagger - 2\sigma^\dagger \rho \sigma) - \left(\frac{\beta}{2} - \frac{\alpha}{4}\right)(\rho - \sigma_z \rho \sigma_z),$$

In Equation 5, $\omega \in [-1, 1]$ is the equilibrium state of atom inversion, and $\alpha \in \mathbb{R}^+$ and $\beta \in \mathbb{R}^+$ ($\beta \geq \alpha/2$) are atomic decay rates.

In relation to the change process of the energy state of the quantum system, the following two processes are present.

1. Incoherent pumping process: spontaneous emission is a process of a quantum system irreversibly decaying while emitting quantum in the form of a photo from an excited energy state to a ground energy state. For example, the equilibrium state $\omega = -1$ of atom inversion indicates that atoms are in the ground state. In contrast, the pumping process includes a case of $\omega > -1$. In this case, there is transition from a low energy state to a high energy state. In particular, if $\omega > 0$, inversion is positive and an atom entity increases. The concept of the pumping process is basically important in the laser theory for a multi-level energy system.

2. Virtual process: If $\beta > \alpha/2$, evolution is construed as including a virtual process in which a loss of quantum coherence is generated without a loss of an atom entity. In the 2-level atom system, an atom decay rate $\beta$ describes a phenomenological decay rate of an atom dipole as a Bloch vector expression of dynamics.

B. A time-correlated channel is described below.

In a substantial quantum transmission system according to an embodiment of the present invention, a correlation channel (noise) operating through consecutive uses may occur. Assuming that the quantum channel has a completely positive and trace preserving property (CTPP) as described above, the stochastic map $\Phi(\rho)$ of Equation 1 may be expressed as in Equation 6.

$$\Phi(\rho) = \sum_i A_i \rho A_i^\dagger \quad (6)$$

In Equation 6, $A_i = \sqrt{P_{i_1,\ldots,i_N}} E_i$ is a Kraus operator having a probability $P_{i_1,\ldots,i_N}$ for a random sequence of a length N (or a sequence of N qubits), and satisfies $\Sigma_i P_{i_1,\ldots,i_N} = 1$. In a mathematical configuration for a memory effect through consecutive channels, $P_{i_1,\ldots,i_N}$ has a Markov chain property as in Equation 7.

$$P_{i_1,\ldots,i_N} = P_{i_1} P_{i_2|i_1} \cdots P_{i_N|i_{N-1}} \quad (7)$$

In Equation 7, $P_{i_N|i_{N-1}}$ is a conditional probability. In one embodiment of the present invention, the use of two consecutive channels may be assumed. The stochastic map $\Phi(\rho)$ for a time-correlated channel may be expressed as in Equation 8 using the degree $\mu \in [0, 1]$ of the channel memory.

$$\Phi(\rho) = (1-\mu)\sum_{i,j} A_{ij}^u \rho A_{ij}^{u\dagger} + \mu \sum_k A_k^c \rho A_k^{c\dagger} \quad (8)$$

In Equation 8, $A_{ij}^u = A_i \otimes A_j$ is the first Kraus operator not having a correlation, and $A_k^c$ is the second Kraus operator having a correlation. The stochastic map of Equation 8 may be construed as being a composite channel. In this case, the transitions of consecutive uses of a qubit are the same as the probability of $\mu$. In contrast, the transitions of consecutive uses of a qubit are decoherent as the probability of $1-\mu$.

The Kraus operator $A_k^c$ for a time-correlated Pauli channel or a time-correlated phase damping channel (depolarizing channel) may simply include the Kronecker product of a Pauli operator. Furthermore, a CTTP map for a time-correlated amplitude damping channel may be monitored using a damping eigenoperator for Lindbald.

With respect to a Markovian quantum channel having memory, the Kraus operator $A_k^c$ may be calculated by calculating a solution to an Lindbaldian equation modified as in Equation 9.

$$\mathcal{L}\rho(\alpha, \beta, w) = -\frac{\alpha}{4}(1-w)(\tilde{\sigma}^\dagger \tilde{\sigma} \rho + \rho \tilde{\sigma}^\dagger \tilde{\sigma} - 2\tilde{\sigma} \rho \tilde{\sigma}^\dagger) - \quad (9)$$

$$\frac{\alpha}{4}(1+w)(\tilde{\sigma} \tilde{\sigma}^\dagger \rho + \rho \tilde{\sigma} \tilde{\sigma}^\dagger - 2\tilde{\sigma}^\dagger \rho \tilde{\sigma}) - \left(\frac{\beta}{2} - \frac{\alpha}{4}\right)(\rho - \tilde{\sigma}_z \rho \tilde{\sigma}_z)$$

In Equation 9, and $\tilde{\sigma}^\dagger = \sigma^I \otimes \sigma^\dagger$, $\tilde{\sigma} = \sigma \otimes \sigma$, and $\tilde{\sigma}_z = \sigma_z \otimes \sigma_z$.

Figure 4:
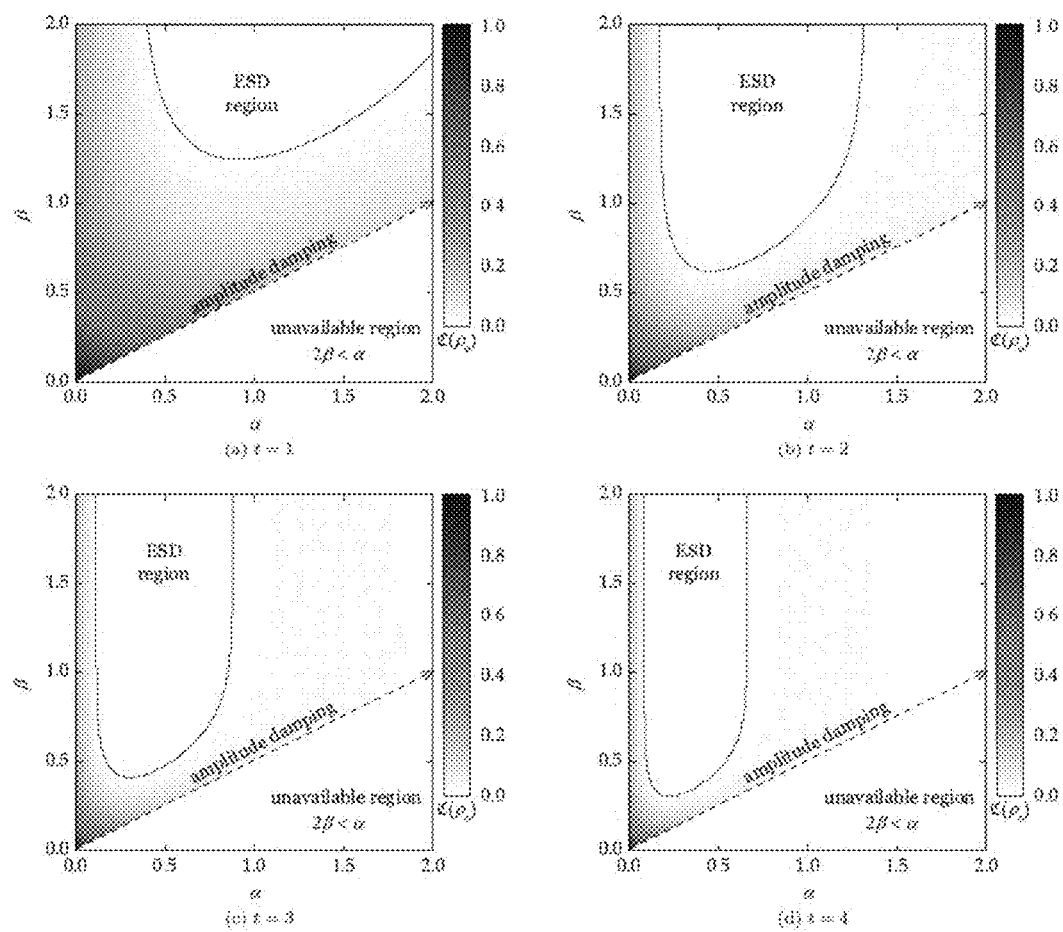
FIG. 4 shows the concurrence of a density function as a function of $(\alpha,\beta)$ according to an embodiment of the present invention.

FIG. 4 shows the evolution of two qubits in a time-correlated Markov quantum channel (TCMQC) for (a) a memoryless channel and (b) a fully correlated channel according to an embodiment of the present invention. In the memoryless channel, the two qubits independently evolve. In contrast, in he fully correlated channel, the two qubits evolve in the same process.

C. Solution of Lindbladian and Kraus Decomposition is described below.

In Equation 8, the Kraus operator $A_k^c$ may be obtained by calculating Lindbladian in Equation 9. A solution to a master equation is related to the calculation of a solution to an eigenvalue equation using an orthogonal damping basis that expands the density operator in a specific time as in Equation 10.

$$\Phi(\rho) = \exp(\mathcal{L}t)\rho \quad (10)$$

$$= \sum_i \mathrm{tr}(L_i \rho) \exp(\lambda_i t) R_i$$

In Equation 10, $\mathcal{L}$ is an Liouville superoperator. The first step is to determine an eigenoperator Ri on the right side that satisfies an eigenvalue equation, such as Equation 11.

$$\mathcal{L} R_i = \lambda_i R_i \quad (11)$$

In Equation 11, $\lambda i$ is a corresponding eigenvalue. An eigenoperator Li on the left side may be determined as in Equation 12 from a duality relation between the eigenoperator Ri on the right side and the eigenoperator Li on the left side.

$$tr(L_i R_j) = \delta_{ij} \quad (12)$$

The eigenoperator Ri on the right side and the eigenoperator Li on the left side satisfy the relation of Equation 13.

$$\begin{cases} \lambda_1 = \lambda_2 = \lambda_3 = \lambda_8^{\pm} = 0 \\ \lambda_4 = -\alpha \\ \lambda_5^{\pm} = \lambda_6^{\pm} = -\frac{1}{4}(4\beta - \alpha(1+w)) \\ \lambda_7^{\pm} = -\alpha/2 \\ \lambda_9^{\pm} = \lambda_{10}^{\pm} = -\frac{1}{4}(4\beta - \alpha(1-w)) \end{cases} \quad (13)$$

As a result, the corresponding CPTP map may be expressed as in Equation 14.

$$\Phi(\rho) = \sum_i \text{tr}(L_i \rho)(\exp(\lambda_i t)) R_i \quad (14)$$

The Kraus operator may be expressed using $\Lambda k$. $\Lambda k$ may be expressed as follows. In this case, $\overline{\Lambda}_k = 1 - \Lambda_k$ may be expressed, for convenience sake. In relation to this, the Kraus operator and the density matrix are described in detail.

$$\begin{cases} \Lambda_1 = e^{-\frac{1}{4}(4\beta - \alpha(1+w))t} \\ \Lambda_2 = e^{-\frac{1}{4}(4\beta - \alpha(1+w))t} \\ \Lambda_3 = e^{-\frac{1}{2}\alpha t} \\ \Lambda_4 = e^{-2\beta t} \\ \Lambda_5 = \frac{1+w}{2}(1 - e^{-\alpha t}) \\ \Lambda_6 = \frac{1-w}{2}(1 - e^{-\alpha t}) \end{cases}$$

If the elements of a (Klaus operator) density matrix $\rho$ are given as $\rho_{ij} \in \mathbb{C}$, an output state $\Phi(\rho)$ may be expressed as in Equation 15 using an initial state $\rho$.

$$\Phi(\rho) = \begin{pmatrix} \tilde{\Lambda}_6 \rho_{11} + \Lambda_5 \rho_{44} & \Lambda_1 \rho_{12} & \Lambda_1 \rho_{12} & \Lambda_3 \rho_{14} \\ \Lambda_1 \rho_{21} & \rho_{22} & \rho_{23} & \Lambda_2 \rho_{24} \\ \Lambda_1 \rho_{31} & \rho_{32} & \rho_{33} & \Lambda_2 \rho_{34} \\ \Lambda_3 \rho_{41} & \Lambda_2 \rho_{42} & \Lambda_2 \rho_{43} & \Lambda_6 \rho_{11} + \Lambda_5 \rho_{44} \end{pmatrix} \quad (15)$$

In Equation 15, a CPTP map corresponding to the fully correlated TCMQC may include six Kraus operators in Equations 16 to 22.

$$A_1^c = \begin{pmatrix} \Lambda_1 & 0 & 0 & 0 \\ 0 & 1 & 0 & 0 \\ 0 & 0 & 1 & 0 \\ 0 & 0 & 0 & \Lambda_2 \end{pmatrix} \quad (16)$$

$$A_2^c = \begin{pmatrix} \sqrt{\Lambda_3 - \Lambda_1 \Lambda_2} & 0 & 0 & 0 \\ 0 & 0 & 0 & 0 \\ 0 & 0 & 0 & 0 \\ 0 & 0 & 0 & \sqrt{\Lambda_3 - \Lambda_1 \Lambda_2} \end{pmatrix} \quad (17)$$

$$A_3^c = \begin{pmatrix} \sqrt{1 - \Lambda_1(\Lambda_1 - \Lambda_2) - \Lambda_3 - \Lambda_6} & 0 & 0 & 0 \\ 0 & 0 & 0 & 0 \\ 0 & 0 & 0 & 0 \\ 0 & 0 & 0 & 0 \end{pmatrix} \quad (18)$$

$$A_4^c = \begin{pmatrix} 0 & 0 & 0 & 0 \\ 0 & 0 & 0 & 0 \\ 0 & 0 & 0 & 0 \\ 0 & 0 & 0 & \sqrt{1 + \Lambda_2(\Lambda_1 - \Lambda_2) - \Lambda_3 - \Lambda_6} \end{pmatrix} \quad (19)$$

$$A_5^c = \begin{pmatrix} 0 & 0 & 0 & \Lambda_5 \\ 0 & 0 & 0 & 0 \\ 0 & 0 & 0 & 0 \\ 0 & 0 & 0 & 0 \end{pmatrix} \quad (20)$$

$$A_6^c = \begin{pmatrix} 0 & 0 & 0 & 0 \\ 0 & 0 & 0 & 0 \\ 0 & 0 & 0 & 0 \\ \Lambda_6 & 0 & 0 & 0 \end{pmatrix} \quad (21)$$

A relation, such as Equation 22, is established between the CPTP map and the superoperator.

$$\sum_i \text{tr}(L_i \mid \rho) \exp(\lambda_i t) R_i = \sum_k A_k^c \rho A_k^{c\dagger} \quad (22)$$

A density matrix $\rho x$ for an X state as the (density matrix) initial state is the same as Equation 23.

$$\rho_X = \begin{pmatrix} \rho_{11} & 0 & 0 & \rho_{14} \\ 0 & \rho_{22} & \rho_{23} & 0 \\ 0 & \rho_{23}^* & \rho_{33} & 0 \\ \rho_{14}^* & 0 & 0 & \rho_{44} \end{pmatrix} \quad (23)$$

In Equation 23, $\rho_{11}, \rho_{22}, \rho_{33}, \rho_{44} \in \mathbb{R}$, $\rho_{11} + \rho_{22} + \rho_{33} + \rho_{44} = 1$ and $\rho_{14}, \rho_{23} \in \mathbb{C}$ are satisfied. Thereafter, a CPTP map $\Phi(\rho x)$ for the fully correlated TCMQC is not the function of $\beta$, and the Kraus operator $A_k^c$ of the CPTP map $\Phi(\rho x)$ is given like Equations 24 to 27. In this case, P and k are expressed as in Equations 28 and 29.

$$A_1^c = \sqrt{P} \begin{pmatrix} \sqrt{1-\kappa} & 0 & 0 & 0 \\ 0 & 1 & 0 & 0 \\ 0 & 0 & 1 & 0 \\ 0 & 0 & 0 & 1 \end{pmatrix} \quad (24)$$

$$A_2^c = \sqrt{P} \begin{pmatrix} 0 & 0 & 0 & 0 \\ 0 & 0 & 0 & 0 \\ 0 & 0 & 0 & 0 \\ \sqrt{\kappa} & 0 & 0 & 0 \end{pmatrix} \quad (25)$$

$$A_3^c = \sqrt{1-P} \begin{pmatrix} 1 & 0 & 0 & 0 \\ 0 & 1 & 0 & 0 \\ 0 & 0 & 1 & 0 \\ 0 & 0 & 0 & \sqrt{1-\kappa} \end{pmatrix} \quad (26)$$

$$A_4^c = \sqrt{1-P}\begin{pmatrix} 0 & 0 & 0 & \sqrt{\kappa} \\ 0 & 0 & 0 & 0 \\ 0 & 0 & 0 & 0 \\ 0 & 0 & 0 & 0 \end{pmatrix} \quad (27)$$

$$P = \frac{1-w}{2} \quad (28)$$

$$\kappa = 1 - e^{\alpha t} \quad (29)$$

A method of obtaining the Kraus operator $A_k^c$ depending on the type of quantum channel is described below.

1. A Time-Correlated Phase Damping Channel

A phase damping channel is accompanied by the phase randomization process of an atom dipole derived by an atom collision. In this channel, a channel decoherence parameter is given as in Equation 30.

$$\alpha=0,\ \beta=\Gamma,\ \omega=0 \quad (30)$$

In Equation 30, $\Gamma$ is a decay parameter attributable to a collision. In Equation 9, Lindbladian for a time-correlated phase damping channel may be expressed as in Equation 31.

$$\mathcal{L}\rho(\Gamma) = -\frac{\Gamma}{2}(\rho - \sigma_z\rho\sigma_z) \quad (31)$$

Since $A_k^c=0$ with respect to k=3, ..., 6, only two Kraus operators as in Equation 32 and 33 are necessary for a fully correlated phase damping channel.

$$A_1^c = \begin{pmatrix} \sqrt{e^{-2\Gamma t}} & 0 & 0 & 0 \\ 0 & 1 & 0 & 0 \\ 0 & 0 & 1 & 0 \\ 0 & 0 & 0 & \sqrt{e^{-2\Gamma t}} \end{pmatrix} \quad (32)$$

$$A_2^c = \begin{pmatrix} \sqrt{1-e^{-2\Gamma t}} & 0 & 0 & 0 \\ 0 & 0 & 0 & 0 \\ 0 & 0 & 0 & 0 \\ 0 & 0 & 0 & \sqrt{1-e^{-2\Gamma t}} \end{pmatrix} \quad (33)$$

Furthermore, $A_1^c$ and $A_2^c$ may be given as in Equation 34.

$$A_1^c = \sqrt{1-p}I \otimes I,\ A_2^c = \sqrt{p}\sigma_z \quad (34)$$

In Equation 34, $p = \frac{1}{2}(1-\exp(-\Gamma t))$

2. A Time-Correlated Amplitude Damping Channel

An amplitude decay channel is identical with that of spontaneous emission for a 2-level atom. Exponential decay occurs from the excited state to the ground state due to a vacuum fluctuation. In such a channel, a decoherence parameter is given as in Equation 35.

$$\alpha = \Omega,\ \beta = \frac{\Omega}{2},\ w = -1 \quad (35)$$

In Equation 35, $\Omega$ indicates a coefficient for spontaneous emission, and Lindbladian for a time-correlated amplitude damping channel is given as in Equation 36.

$$\mathcal{L}\rho(\Omega) = -\frac{\Omega}{2}(\sigma^\dagger\sigma\rho + \rho\sigma^\dagger\sigma - 2\sigma\rho\sigma^\dagger) \quad (36)$$

Since $A_k^c=0$ with respect to k=2 ..., 5, only two Kraus operators are necessary for a fully correlated phase damping channel as in Equations 37 and 38.

$$A_1^c = \begin{pmatrix} \sqrt{e^{-\Omega t}} & 0 & 0 & 0 \\ 0 & 1 & 0 & 0 \\ 0 & 0 & 1 & 0 \\ 0 & 0 & 0 & 1 \end{pmatrix} \quad (37)$$

$$A_2^c = \begin{pmatrix} 0 & 0 & 0 & 0 \\ 0 & 0 & 0 & 0 \\ 0 & 0 & 0 & 0 \\ \sqrt{1-e^{-\Omega t}} & 0 & 0 & 0 \end{pmatrix} \quad (38)$$

Unlike in a case where $A_1^c$ and $A_2^c$ correspond to a time-correlated phase damping channel (refer to Equation 34), it is to be noted that $A_1^c$ and $A_2^c$ may be reconfigured as the tensor product of two matrices. This may be construed as being a spooky action compared to a non-memory amplitude damping channel. In this case, two qubits independently decay, and a fully time-correlated (full memory) amplitude damping channel permits only the sync switch of the two qubits.

3. A Time-Correlated Generalized Amplitude Damping Channel (Thermal Field Channel)

A generalized amplitude damping channel may describe both a gain excitation and loss derived by an interaction with an environment. In a limitative-temperature environment having a specific probability, the absorption of energy enables the transition of atoms from the ground state to the excited data. Unlike in an amplitude damping channel, a saturation state after a sufficient lapse of time is located at a point according to the z axis of a Bloch sphere. In such a channel, a decoherence parameter is given as in Equation 39.

$$\alpha = \Omega(2N+1),\ \beta = \frac{\Omega(2N+1)}{2},\ w = -\frac{1}{2N+1} \quad (39)$$

In Equation 39, N is the number of photons. If N→0, N is simplified into an amplitude damping channel. Equation 40 indicates Lindbladian for a generalized amplitude damping channel.

$$\mathcal{L}\rho(\Omega, N) = -\frac{\Omega(N+1)}{2}(\sigma^\dagger\sigma\rho + \rho\sigma^\dagger\sigma - 2\sigma\rho\sigma^\dagger) - \frac{\Omega N}{2}(\sigma\sigma^\dagger\rho + \rho\sigma\sigma^\dagger - 2\sigma^\dagger\rho\sigma). \quad (40)$$

In Equation 40, since $A_2^c=0$, only five Kraus operator are obtained. A Kraus operator for the time-correlated generalized amplitude damping channel is given as in Equations 24 to 27. In this case, $$P = \frac{N+1}{2N+1}$$

and $\kappa=1-e^{-\Omega(2N+1)t}$ are given.

The restriction of typical quantum channels is described below. In this case, the typical quantum channels are restricted by the equilibrium of an atom transition parameter $-1 \leq \omega \leq 0$, meaning that there is no pumping process using positive transition. The quantum channel may be construed as being a mixture of phase distortion and a generalized amplitude damping channel using the presence ($\beta > \alpha/2$) of a virtual process. Decoherence severity derived by phase distortion may be qualified by $\gamma=\beta-\alpha/2$.

The dynamics of a quantum correlation are described below. In this case, a channel memory and decoherence effect between the two consecutive uses of the channel is analyzed. A density matrix $\rho=|\psi\rangle\langle\psi|$ is considered to be the initial state. In this case, $|\psi\rangle$ is an entangled pure state for two qubits as in Equation 41. In this case, $a \cdot b \in \mathbb{C}$ and $|a|^2+|b|^2=1$ $$|\psi\rangle = a|00\rangle + b|11\rangle \tag{41}$$

The initial state $|\psi\rangle$ passes through the TCMQC and evolves into a contaminated state $\Phi(\rho)=\rho_o$. A density matrix is given like Equation 42. In this case, $\rho_{11}$ to $\rho_{44}$ are expressed as in Equation 43.

$$\rho_o \begin{pmatrix} \rho_{11} & 0 & 0 & \rho_{14} \\ 0 & \rho_{22} & 0 & 0 \\ 0 & 0 & \rho_{33} & 0 \\ \rho_{14}^* & 0 & 0 & \rho_{44} \end{pmatrix} \tag{42}$$

$$\rho_{11} = (\overline{\Lambda}_6^2|a|^2 + \Lambda_5^2|b|^2)(1-\mu) + (\overline{\Lambda}_6|a|^2 + \Lambda_5|b|^2)\mu \tag{43}$$
$$\rho_{22} = (\Lambda_6\overline{\Lambda}_6|a|^2 + \Lambda_5\overline{\Lambda}_5|b|^2)(1-\mu)$$
$$\rho_{33} = (\Lambda_6\overline{\Lambda}_6|a|^2 + \Lambda_5\overline{\Lambda}_5|b|^2)(1-\mu)$$
$$\rho_{44} = (\Lambda_6^2|a|^2 + \overline{\Lambda}_5^2|b|^2)(1-\mu) + (\Lambda_6|a|^2 + \overline{\Lambda}_5|b|^2)\mu$$
$$\rho_{14} = ab^*\Lambda_4(1-\mu) + ab^*\Lambda_3\mu.$$

A. Dynamics of Quantum Entanglement

The following is obtained by taking into consideration the dynamics of quantum entanglement between two qubits that pass through the TCMQC. In order to qualify dichotomy entanglement, concurrence $\mathfrak{C}(\cdot)$ may be defined. With respect to specific two qubits, the concurrence may be calculated from the density matrix $\rho$ as in Equation 44.

$$\mathfrak{C}(\rho) = \max\{0, \sqrt{\lambda_{(1)}} - \sqrt{\lambda_{(2)}} - \sqrt{\lambda_{(3)}} - \sqrt{\lambda_{(4)}}\} \tag{44}$$

In Equation 44, $\lambda_{(1)} > \lambda_{(2)} > \lambda_{(3)} > \lambda_{(4)}$ is an eigenvalue of a descending order form of a density matrix $\rho\sigma_y\rho^*\sigma_y$. With respect to the state in Equation 23, the concurrence is expressed as in Equation 45.

$$\mathfrak{C}(\rho_x) = 2\max\{0, |\rho_{23}| - \sqrt{\rho_{11}\rho_{44}}, |\rho_{14}| - \sqrt{\rho_{22}\rho_{33}}\} \tag{45}$$

The concurrence is described more specifically below. A density matrix $\rho=|\psi\rangle\langle\psi|$ may be taken into consideration as the initial state using the entanglement state $|\psi\rangle=a|00\rangle+b|11\rangle$ described with respect to the two qubits. After the two qubits pass through the TCMQC, the concurrence $\mathfrak{C}(\rho_o)$ of a contaminated state is given as Equation 46. In this case, some parameters are expressed as in Equation 47 and 48.

$$\mathfrak{C}(\rho_o) = 2\max\{0, (1-\mu)\mathfrak{C}^u + \mu\mathfrak{C}^c\} \tag{46}$$

$$\mathfrak{C}^u = |ab|\Lambda_4 - (|a|^2\Lambda_6\overline{\Lambda}_6 + |b|^2\Lambda_5\overline{\Lambda}_5) \tag{47}$$

$$\mathfrak{C}^c = |ab|\Lambda_3 \tag{48}$$

In some special cases, the concurrence may be obtained as follows. The first, the second device 100, 200 may obtain the concurrence using a simple method as follows according to a special situation. Alternatively, the first, second device may obtain the concurrence over time and then estimate a special situation for a quantum channel.

An uncorrelated channel ($\mu \to 0$): the concurrence $\mathfrak{C}(\rho_o)$ is expressed as in Equation 49, and an entanglement sudden death (ESD) is generated when Equation 50 is satisfied.

$$\mathfrak{C}(\rho_o) = 2\max\{0, \mathfrak{C}^u\} \tag{49}$$

$$\Lambda_4 \leq \left|\frac{a}{b}\right|\Lambda_6\overline{\Lambda}_6 + \left|\frac{b}{a}\right|\Lambda_5\overline{\Lambda}_5 \tag{50}$$

A fully correlated quantum channel ($\mu \to 1$): the effect of $\beta$ disappears, and the concurrence $\mathfrak{C}(\rho_o)$ is expressed as in Equation 51 depending on an atom dipole decay rate $\alpha$, time t, and the initial state parameter a, b.

$$\mathfrak{C}(\rho_o) = 2|ab|e^{-\frac{1}{2}\alpha t} \tag{51}$$

If $\alpha=\omega=0$, that is, an energy loss is not present in a quantum channel (e.g., a phase damping channel), the concurrence is expressed as in Equation 52.

$$\mathfrak{C}(\rho_o) = 2|ab|((1-\mu)e^{-2\beta t} + \mu) \tag{52}$$

Initially, the concurrence is $2|ab|$ and is exponentially decreased monotonously over time. When a sufficient time elapses, the concurrence converges as in Equation 53.

$$\lim_{t \to \infty} \mathfrak{C}(\rho_o) = 2\mu|ab| \tag{53}$$

This means that in such a quantum channel, ESD is never generated with respect to a specific initial state parameter.

The critical degree of channel memory is described below. The critical degree of channel memory may be defined as in Equation 54, and may be expressed as in Equation 55 with respect to the TCMQC.

$$\mu^* \triangleq \min_{\mu \in (0,1]} \{\mu: \mathfrak{C} > 0\} \tag{54}$$

$$\mu^* = \frac{\mathfrak{C}^u}{\mathfrak{C}^u - \mathfrak{C}^c}. \tag{55}$$

The ESD may be suppressed by the correlation effect of a quantum channel with respect to a sufficiently large channel memory threshold $\mu > \mu^*$.

Figure 5:
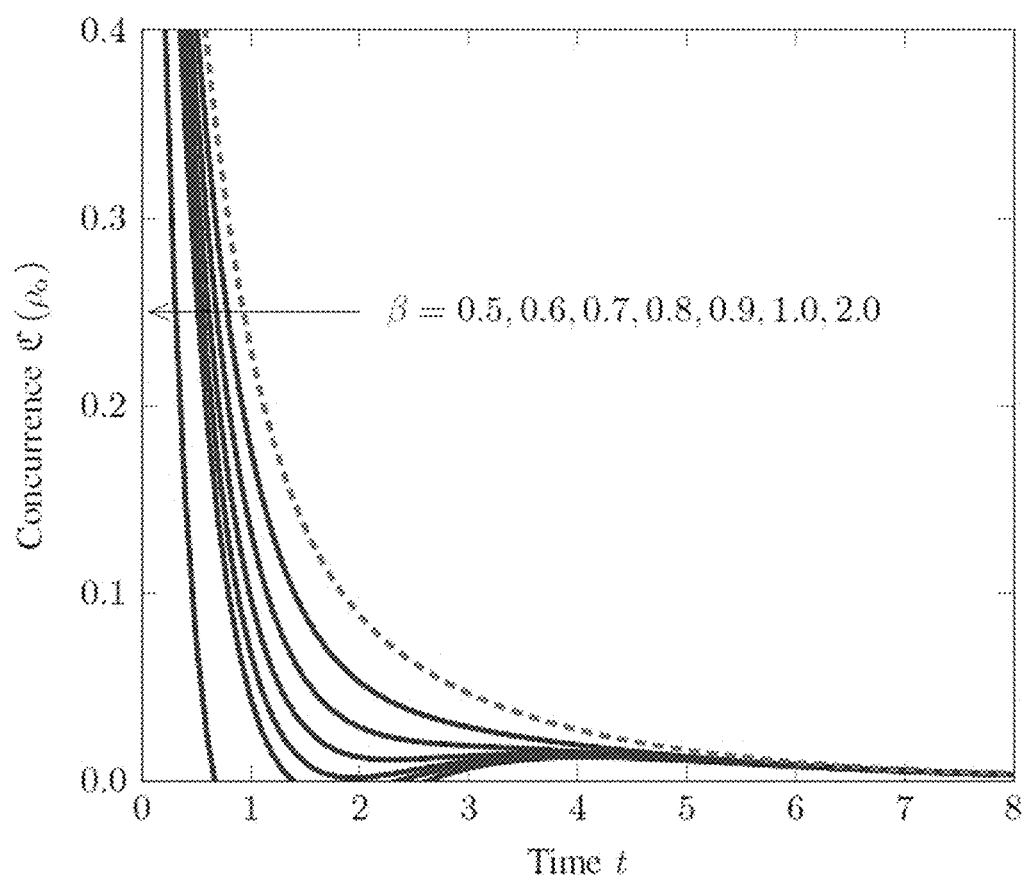
FIGS. 5 to 8 are graphs showing different parameter values and concurrence values of a TCMQC according to a change of time according to an embodiment of the present invention. Specifically.
Figure 6:
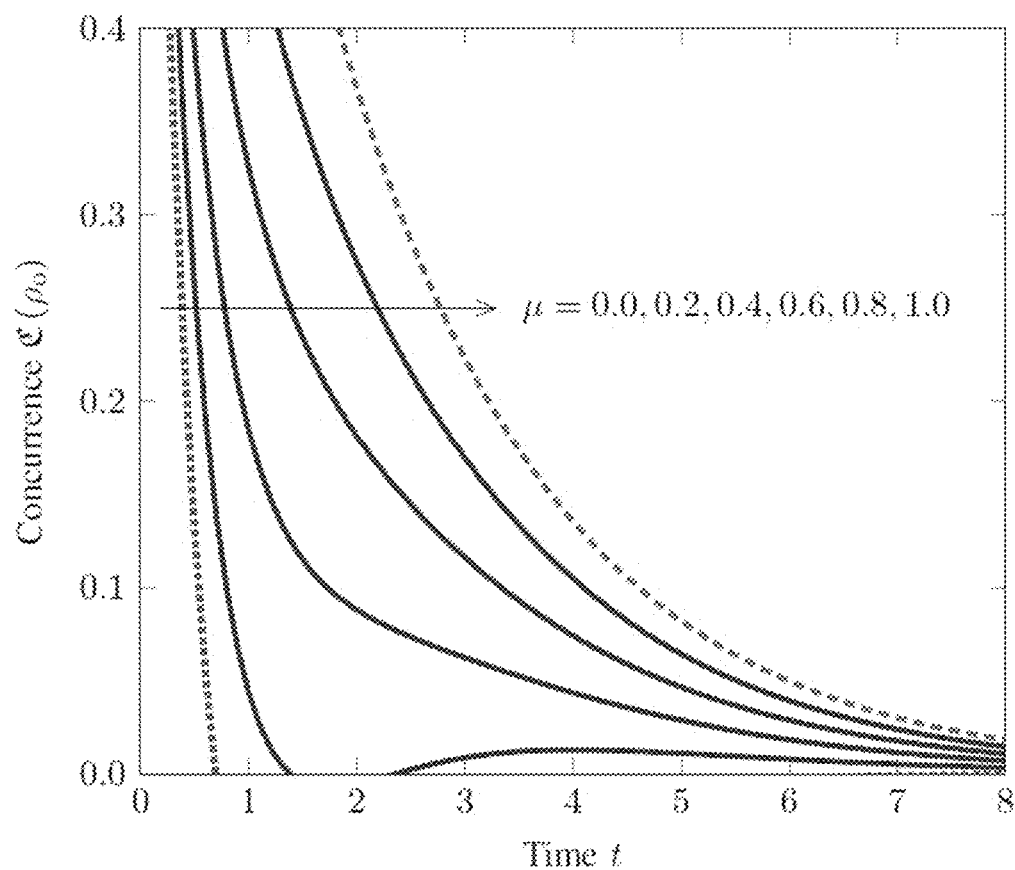
Figure 7:
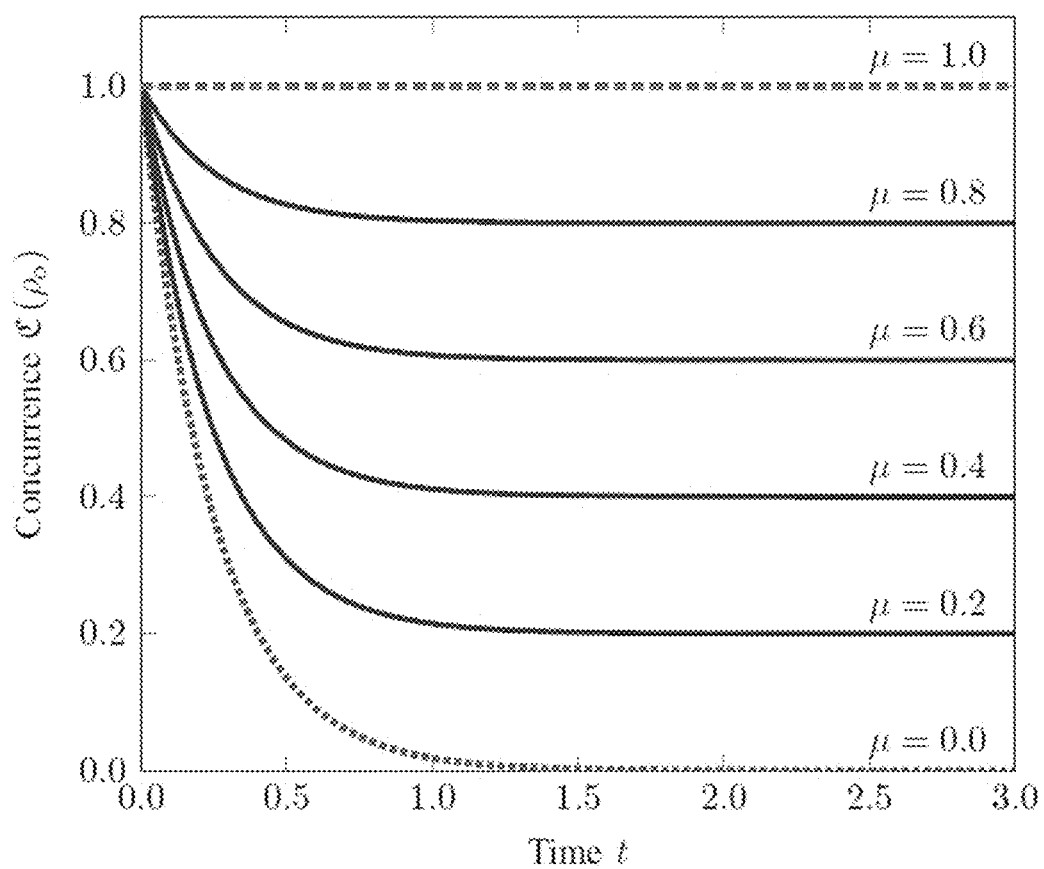
Figure 8:
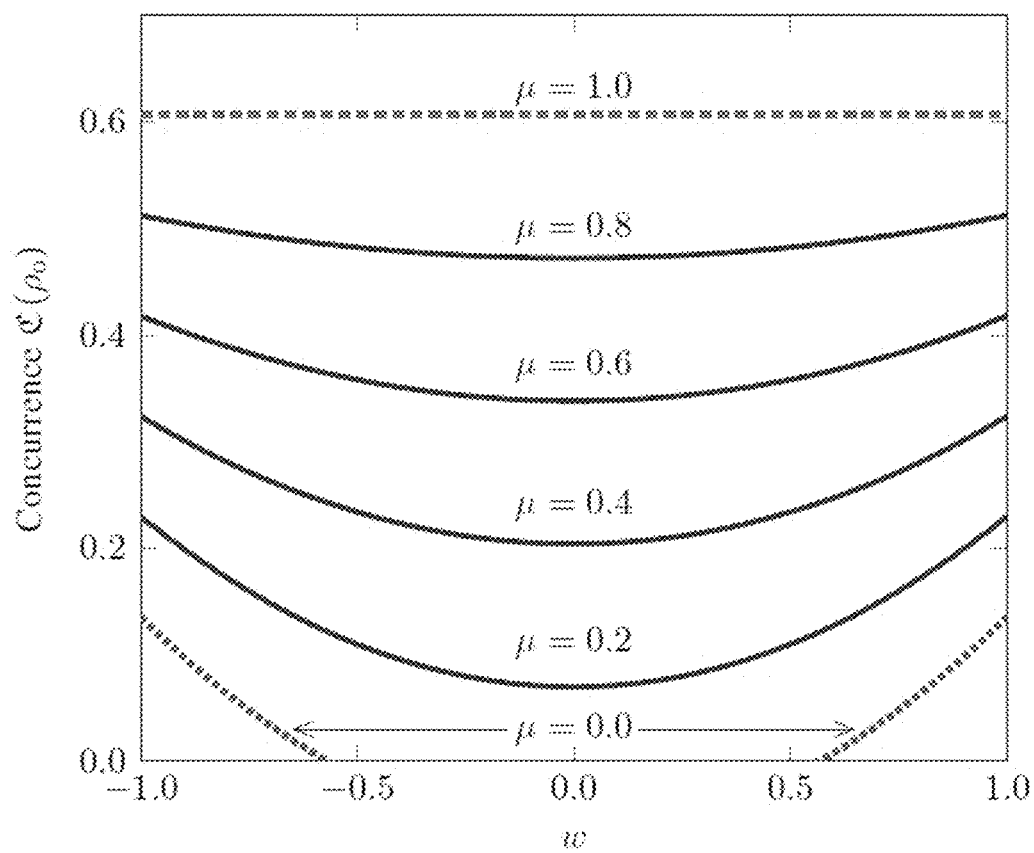
Figure 9:
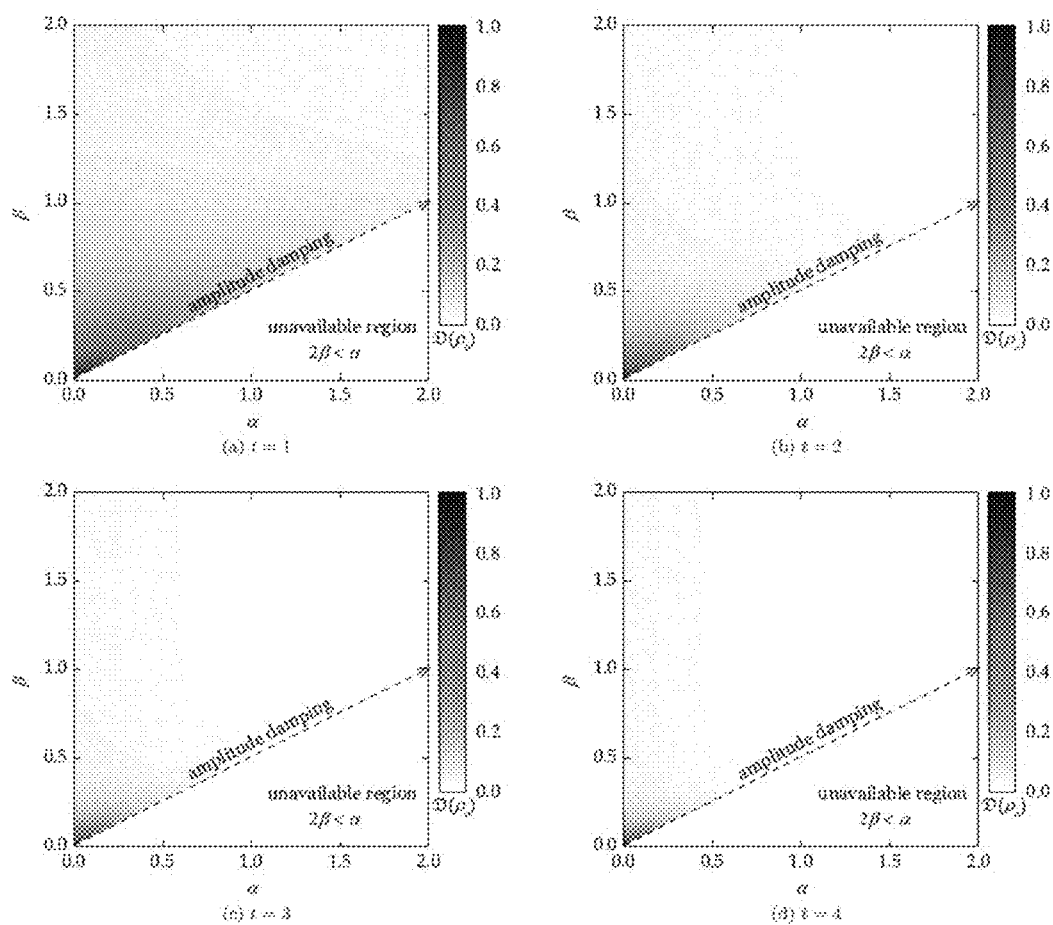
FIG. 9 shows quantum discord of a density function as the function of $(\alpha,\beta)$ according to an embodiment of the present invention.

FIGS. 5 to 8 are graphs showing different parameter values and concurrence values of a TCMQC according to a change of time according to an embodiment of the present invention. Specifically, FIG. 5 shows concurrence according to a change of $\beta$ and t in (1, $\beta$, −1, 0.2). FIG. 6 shows concurrence according to a change of $\mu$ and t in (1, 1, −1, $\mu$). FIG. 7 shows concurrence according to a change of $\mu$ and t in (0, 2, 0$\mu$). FIG. 8 shows concurrence according to a change of $\mu$ and $\omega$ in (1, 0.5, $\omega\mu$).

FIG. 5 is related to entanglement with non-spontaneous emission, and it may be seen that concurrence is reduced over time. FIGS. 5 to 8 are related to the dynamics of quantum entanglement. As described above, the ESD may be suppressed by the correlation effect of a quantum channel with respect to the sufficiently large channel memory threshold $\mu > \mu^*$.

B. Dynamics of Quantum Discord is Described Below.

In Equation 23, the quantum discord is expressed as in Equation 56 with respect to a given X state.

$$\mathfrak{D}(\rho_x) = \min\{Q_1, Q_2\} \tag{56}$$

In this case, Qj is expressed as in Equation 57.

$$Q_j = H(\rho_{11} + \rho_{33}) + \sum_{i=1}^{4} \bar{\lambda}_i \log_2 \bar{\lambda}_i + D_j \tag{57}$$

Furthermore, $H(x) = -x \log_2 x - (1-x)\log_2(1-x)$, and an eigenvalue of $\rho x$ is expressed as in Equations 58 to 61.

$$\bar{\lambda}_1 = \frac{\rho_{22} + \rho_{33} - \sqrt{\rho_{22}^2 + 4|\rho_{23}|^2 - 2\rho_{22}\rho_{33} + \rho_{33}^2}}{2} \tag{58}$$

$$\bar{\lambda}_2 = \frac{\rho_{22} + \rho_{33} + \sqrt{\rho_{22}^2 + 4|\rho_{23}|^2 - 2\rho_{22}\rho_{33} + \rho_{33}^2}}{2} \tag{59}$$

$$\bar{\lambda}_3 = \frac{\rho_{11} + \rho_{44} - \sqrt{\rho_{11}^2 + 4|\rho_{14}|^2 - 2\rho_{11}\rho_{44} + \rho_{44}^2}}{2} \tag{60}$$

$$\bar{\lambda}_4 = \frac{\rho_{11} + \rho_{44} + \sqrt{\rho_{11}^2 + 4|\rho_{14}|^2 - 2\rho_{11}\rho_{44} + \rho_{44}^2}}{2} \tag{61}$$

Furthermore, in Equation 57, $D_1$ and $D_2$ are expressed as in Equations 62 and 63.

$$D_1 = H\left(\frac{1 + \sqrt{(1 - 2(\rho_{33} + \rho_{44}))^2 + 4(|\rho_{14}| + |\rho_{23}|)^2}}{2}\right) \tag{62}$$

$$D_2 = -\sum_{i=1} \rho_{ii} \log_2 \rho_{ii} - H(\rho_{11} + \rho_{33}) \tag{63}$$

The quantum discord for the X state has a form more robust against a change of a parameter than quantum entanglement with respect to Markovian in addition to a non-Markovian dissipative environment. Accordingly, if more accurate quantum channel estimation is required within a narrow range of a parameter, to use the quantum discord rather than the quantum entanglement may be more preferable.

Figure 10:
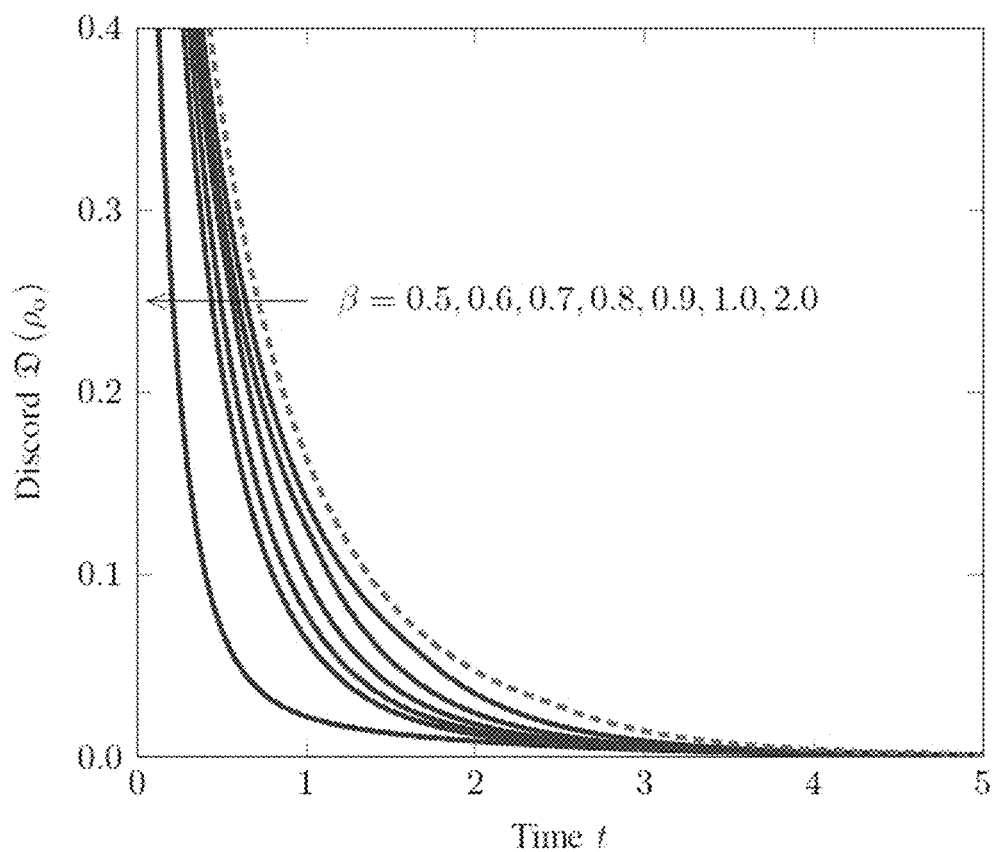
FIGS. 10 to 13 show quantum discord according to the time t/state $\omega$ for different $\beta$ or $\mu$ according to an embodiment of the present invention. Specifically.
Figure 11:
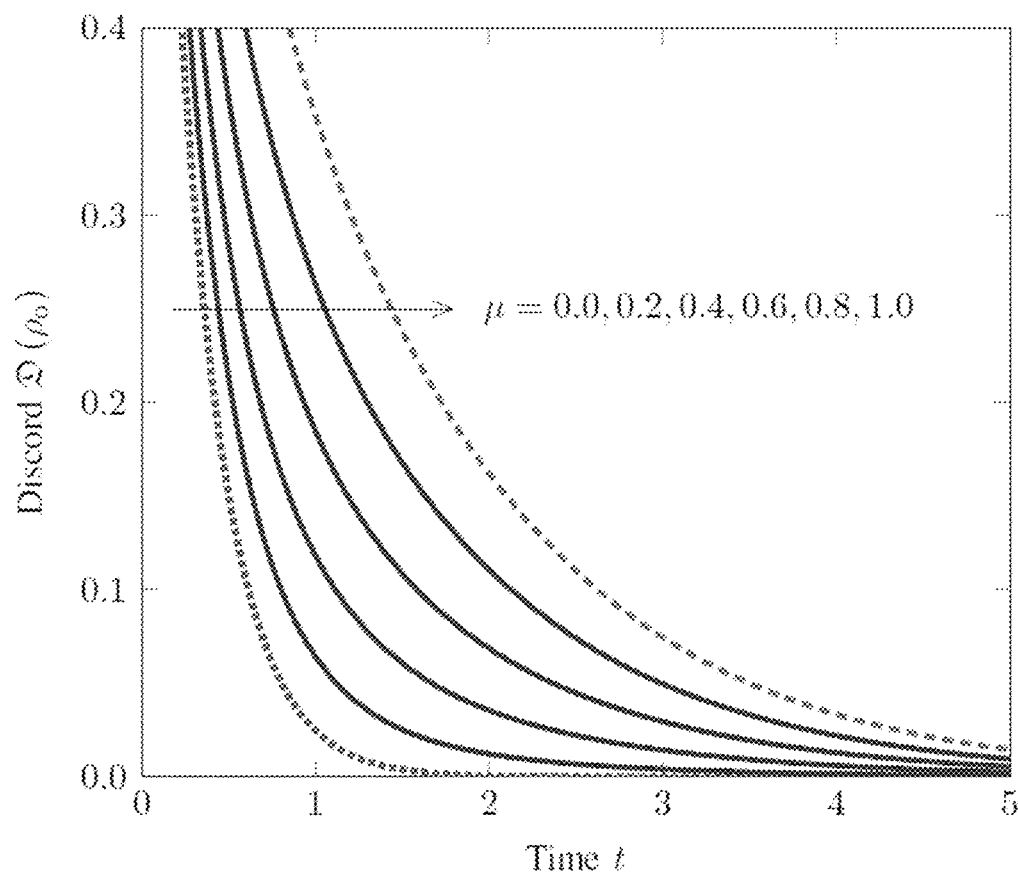
Figure 12:
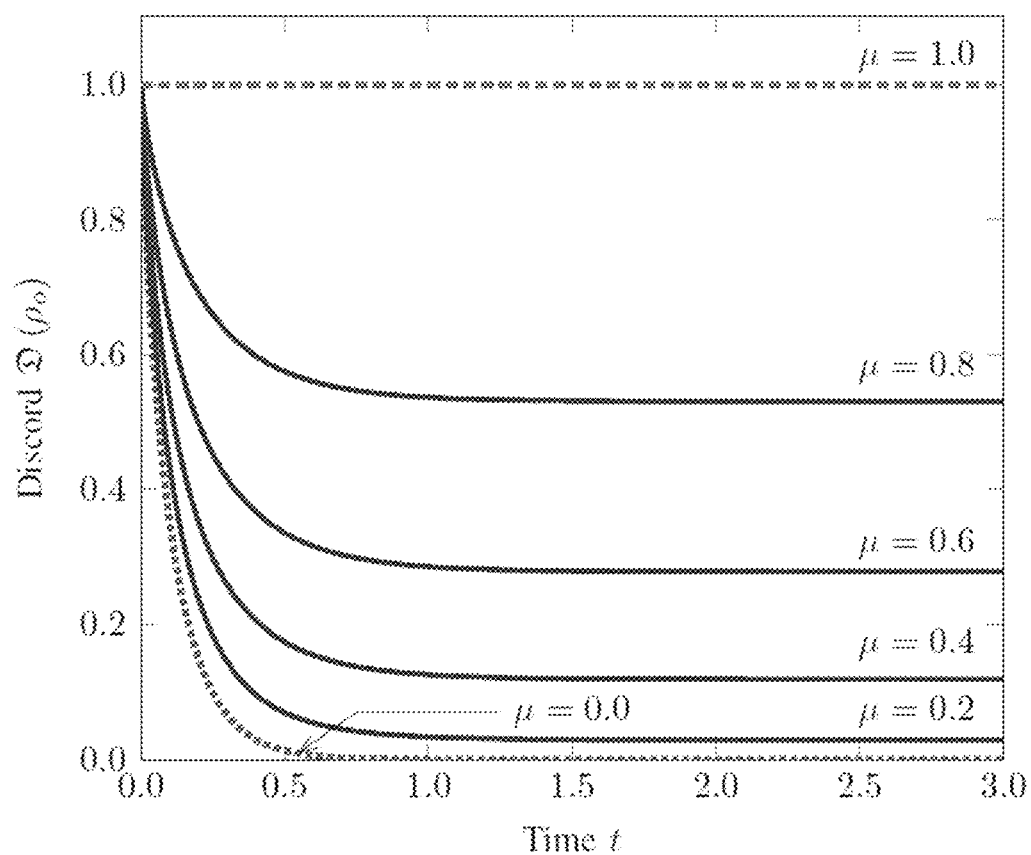
Figure 13:
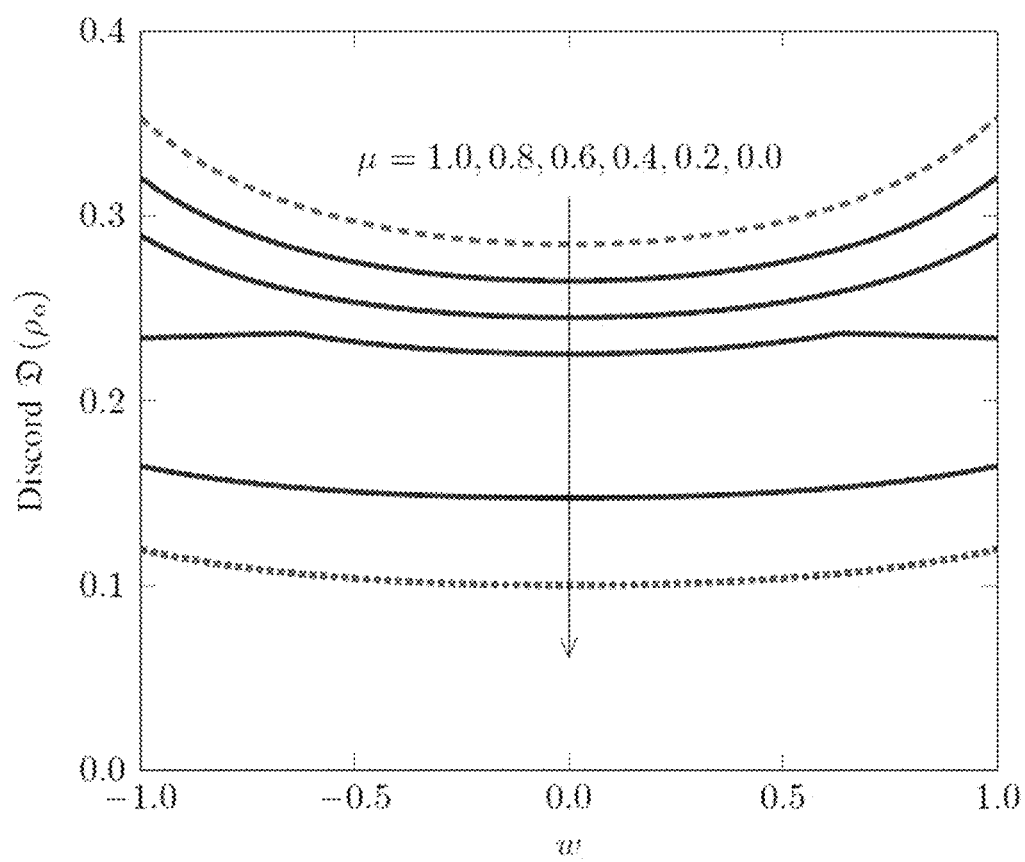

The dynamics of quantum discord is described below. FIGS. 10 to 13 show the quantum discord according to the time t/state ω for different β or μ according to an embodiment of the present invention. Specifically, FIG. 10 shows the quantum discord as the function of t in (1, β, −1, 0.2) with respect to different β. FIG. 11 shows the quantum discord as the function of t in (1, 1, −1, μ) with respect to different μ. FIG. 12 shows the quantum discord as the function of t in (0, 2 0, μ) with respect to different μ. In contrast, FIG. 13 shows the quantum discord as the function of ω in (1, 0.5. ω, μ) with respect to different μ.

From FIGS. 10 and 11, it may be seen that the quantum discord converges on 0 as the time increases. The reason for this is that the effect of a virtual process reduces the quantum discord as expected. As shown in FIG. 12, the quantum discord converges on 0 as the time increases with respect to μ=0 (memoryless channel), but the quantum discord converges on a specific value other than 0 as the time increases with respect to the remaining channels (e.g., if μ=1, a fully correlated channel) other than μ=0. In FIG. 12, when the time t increases and reaches a normal state, the contaminated quantum state is given as in Equation 64.

$$\lim_{t \to \infty} \rho_o = \begin{pmatrix} |a|^2 & 0 & 0 & ab^*\mu \\ 0 & 0 & 0 & 0 \\ 0 & 0 & 0 & 0 \\ a^*b\mu & 0 & 0 & |b|^2 \end{pmatrix} \tag{64}$$

In Equation 64, if $a = b = \sqrt{1/2}$, the quantum discord is given as in Equation 65.

$$\lim_{t \to \infty} \mathfrak{D}(\rho_o) = \min\left\{1, \frac{\mu \tanh^{-1}(\mu) + \ln\sqrt{1 - \mu^2}}{\ln 2}\right\} \tag{65}$$

In FIG. 13, the quantum discord is chiefly determined by $Q_1$ because of $D_1 > D_2$ with respect to a small channel memory value. In contrast, the quantum discord is chiefly determined by $Q_2$ because of $D_1 < D_2$ with respect to a large channel memory value.

Figure 14:
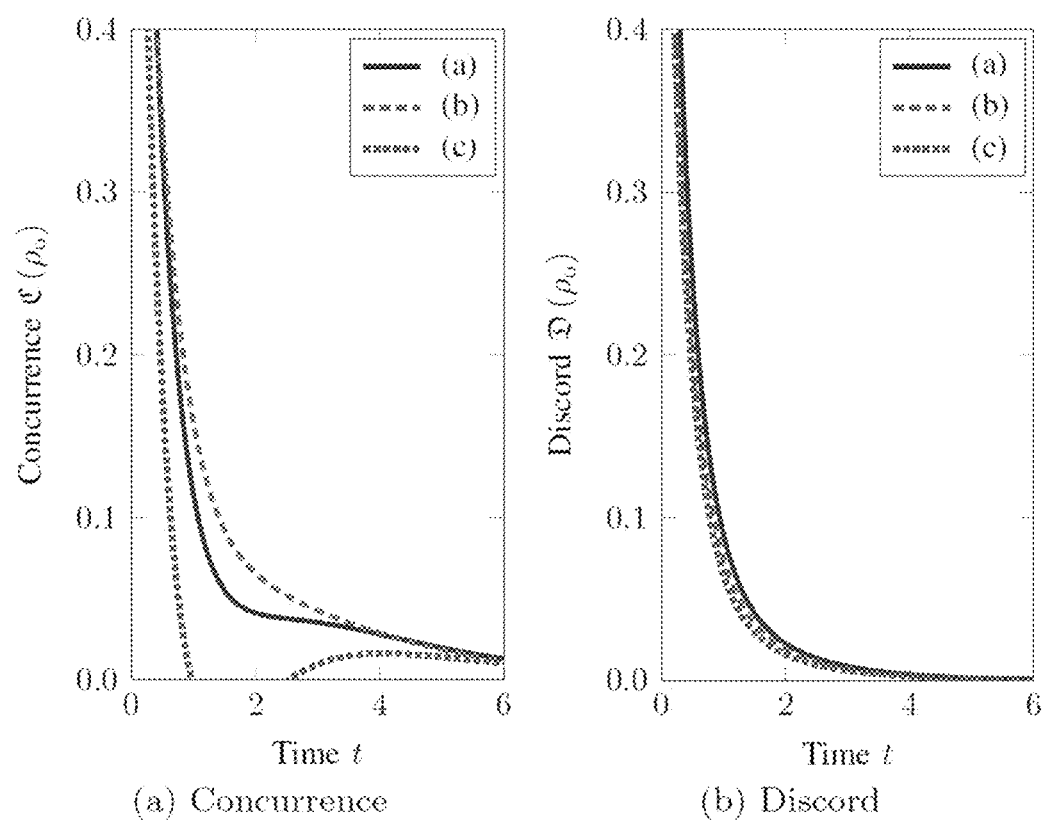
FIG. 14 shows concurrence and quantum discord according to the time t with respect to different values "a" and "b" according to an embodiment of the present invention. Furthermore.
Figure 15:
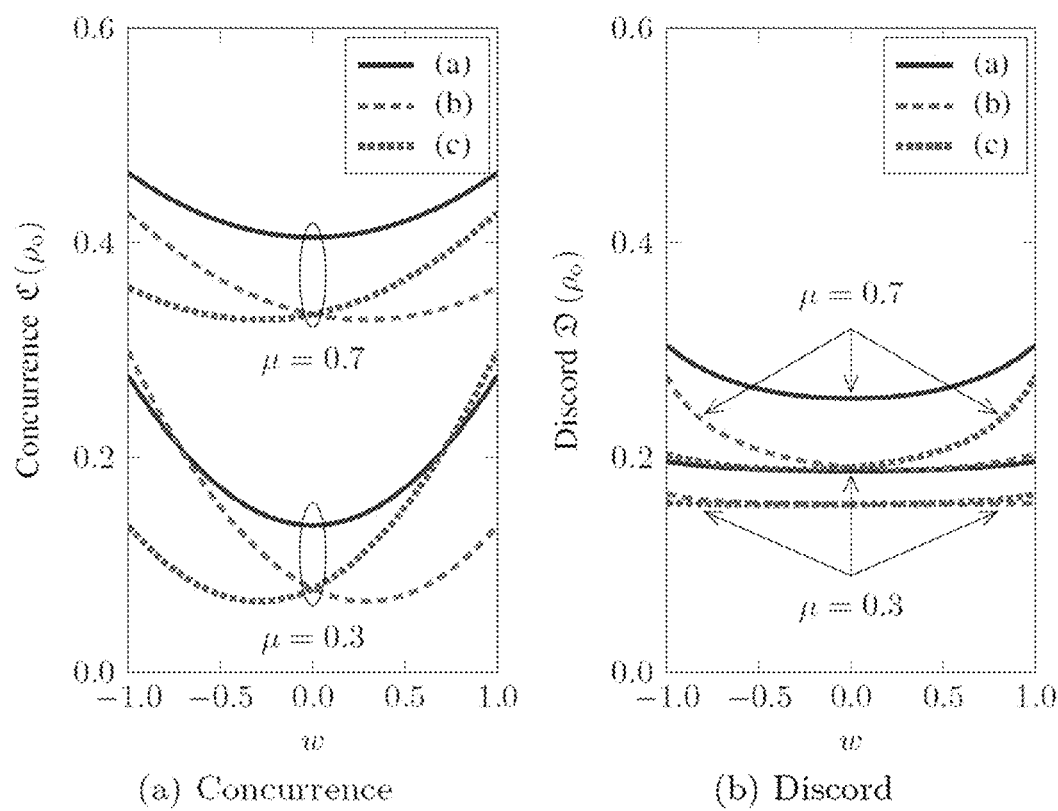
FIG. 15 shows concurrence and quantum discord according to the state ω with respect to different values "a" and "b" according to an embodiment of the present invention.

The influence of an asymmetrical initial state on the dynamics of a quantum correlation dynamics is described below. FIG. 14 shows concurrence and quantum discord according to the time t with respect to different values "a" and "b" according to an embodiment of the present invention. Furthermore, FIG. 15 shows concurrence and quantum discord according to the state ω with respect to different values "a" and "b" according to an embodiment of the present invention. In (a) to (c) of FIG. 13, "a" and "b" are $a = b = \sqrt{1/2}$, $a = \sqrt{1/4}, b = \sqrt{3/4}$, and $a = \sqrt{3/4}, b = \sqrt{1/4}$. That is, in the (a) of FIG. 13, a qubit is a maximum entanglement state. It may be seen that the asymmetrical initial state has a great influence on the concurrence, but does not have a great influence on quantum discord. Accordingly, if a quantum channel is estimated (or monitored) to have the asymmetrical initial state, it may be more preferable to subsequently perform quantum channel estimation using the quantum discord. In (a) to (c) of FIG. 14, as in FIG. 13, "a" and "b" are $a = \sqrt{3/4}, b = \sqrt{1/4}$, $a = b = \sqrt{1/2}$ and $a = \sqrt{1/4}, b = \sqrt{3/4}$. Specifically, the concurrence and the quantum discord are shown as the function of the state ω of (1, 0.5, ω, μ) at t=1 with respect to different "a" and "b." It may be seen that although a ready initial state is not a maximum entanglement state, in particular, a proper pumping process can improve quantum entanglement with respect to a low channel memory region. Furthermore, the pumping process having the asymmetrical initial state has more influence on the concurrence. In contrast, the property for the quantum discord is stronger with respect to a low channel memory region. Accordingly, if the quantum channel is estimated (or monitored) to have a low channel memory property, it is more preferable to subsequently perform quantum channel estimation using the quantum discord.

C. The dynamics of quantum entanglement with quantum state protecting) is described below.

Specifically, the dynamics of quantum entanglement in a time-correlated Markov quantum channel (TCMQC) using weak measurement (WM) and quantum measurement reversal (QMR) are described below. After a sequential quantum operation is performed, the quantum matrix of the final state is given as in Equation 66.

$$\hat{\rho}_o = M_{QMR}[\Phi(M_{WM}|\psi\rangle\langle\psi|M_{WM}^\dagger)]M_{QMR}^\dagger \quad (66)$$

In Equation 66, non-unitary operation for WM and QMR are given as in Equations 67 and 68, respectively. In this case, there are values of the range of measurement strength $mi \in [0,1]$ and $ni \in [0,1]$.

$$M_{WM} = \begin{pmatrix} 1-m_1 & 0 \\ 0 & 1 \end{pmatrix} \otimes \begin{pmatrix} 1-m_2 & 0 \\ 0 & 1 \end{pmatrix} \quad (67)$$

$$M_{QMR} = \begin{pmatrix} 1 & 0 \\ 0 & 1-n_1 \end{pmatrix} \otimes \begin{pmatrix} 1 & 0 \\ 0 & 1-n_2 \end{pmatrix} \quad (68)$$

For convenience of indication, $\bar{m}_i = 1-m_i$ and $\bar{n}_i = 1-n_i$ is indicated. A density matrix for the contaminated state using the quantum state protecting scheme with respect to two qubits having the initial state $|\Psi\rangle = a|00\rangle + b|11\rangle$ is given as in Equation 69.

$$\hat{\rho}_o = \frac{1}{N}\begin{pmatrix} \hat{\rho}_{11} & 0 & 0 & \bar{n}_1\bar{n}_2\hat{\rho}_{14} \\ 0 & \bar{n}_2^2\hat{\rho}_{22} & 0 & 0 \\ 0 & 0 & \bar{n}_1^2\hat{\rho}_{33} & 0 \\ \bar{n}_1\bar{n}_2\hat{\rho}_{14}^* & 0 & 0 & \bar{n}_1^2\bar{n}_2^2\hat{\rho}_{44} \end{pmatrix} \quad (69)$$

In Equation 69, the values of elements within the matrix are given as in Equation 70, and $N = \text{tr}\{\bar{\rho}_o\}$ is a normalization constant.

$$\hat{\rho}_{11} = (\bar{m}_1^2\bar{m}_2^2\bar{\Lambda}_6^2|a|^2 + \Lambda_5^2|b|^2)(1-\mu) + (\bar{m}_1^2\bar{m}_2^2\Lambda_6|a|^2 + \Lambda_5|b|^2)\mu$$

$$\hat{\rho}_{22} = (\bar{m}_1^2\bar{m}_2^2\bar{\Lambda}_6\Lambda_6|a|^2 + \Lambda_5\bar{\Lambda}_5|b|^2)(1-\mu)$$

$$\hat{\rho}_{33} = (\bar{m}_1^2\bar{m}_2^2\Lambda_6\bar{\Lambda}_6|a|^2 + \Lambda_5\bar{\Lambda}_5|b|^2)(1-\mu)$$

$$\hat{\rho}_{44} = (\bar{m}_1^2\bar{m}_2^2\Lambda_6^2|a|^2 + \bar{\Lambda}_5^2|b|^2)(1-\mu) + (\bar{m}_1^2\bar{m}_2^2\Lambda_6|a|^2 + \bar{\Lambda}_5|b|^2)\mu$$

$$\hat{\rho}_{14} = ab^*\bar{m}_1\bar{m}_2\Lambda_4(1-\mu) + ab^*\bar{m}_1\bar{m}_2\Lambda_3\mu \quad (70)$$

Maximum concurrence using optimal QMR intensity is described below. With respect to given WM intensity $m_1$ and $m_2$, maximum concurrence using QMR is given as in Equation 71. Two factors related to the concurrence in the numerator of Equation 71 are given as in Equations 72 and 73.

$$\mathcal{C}^*(\hat{\rho}_o) = 2\max\left\{0, \frac{(1-\mu)\mathcal{C}^u + \mu\mathcal{C}^c}{2\sqrt{\hat{\rho}_{11}\hat{\rho}_{44}} + \hat{\rho}_{22} + \hat{\rho}_{33}}\right\} \quad (71)$$

$$\mathcal{C}^u = \bar{m}_1^2\bar{m}_2^2|ab|\Lambda_4 - (\bar{m}_1^2\bar{m}_2^2|a|^2\Lambda_6\bar{\Lambda}_6 + |b|^2\Lambda_5\bar{\Lambda}_5) \quad (72)$$

$$\mathcal{C}^c = \bar{m}_1\bar{m}_2|ab|\Lambda_3 \quad (73)$$

The concurrence of Equation 71 may be given as in Equation 74. Furthermore, if the relation equation of Equation 75 for the density matrix is used, the relation between the concurrence and the density matrix is given as in Equation 76.

$$\mathcal{C}(\hat{\rho}_o) = \frac{2\bar{n}_1\bar{n}_2}{N}\max\left\{0, |\hat{\rho}_{14}| - \sqrt{\hat{\rho}_{22}\hat{\rho}_{33}}\right\} \quad (74)$$

$$\hat{\rho}_{11} + \bar{n}_1^2\bar{n}_2^2\hat{\rho}_{44} \geq 2\bar{n}_1\bar{n}_2\sqrt{\hat{\rho}_{11}\hat{\rho}_{44}} \quad (75)$$

$$\mathcal{C}(\hat{\rho}_o) \leq \max\left\{0, \frac{|\hat{\rho}_{14}| - \sqrt{\hat{\rho}_{22}\hat{\rho}_{33}}}{\sqrt{\hat{\rho}_{11}\hat{\rho}_{44}} + \frac{\bar{n}_0}{2\bar{n}_1}\hat{\rho}_{22} + \frac{\bar{n}_1}{2\bar{n}_2}\hat{\rho}_{33}}\right\} \quad (76)$$

In this case, if the relation between measurement strength n1, n2 and the density matrix satisfies Equation 77, an equation is established in Equation 75.

$$\bar{n}_1\bar{n}_2 = \sqrt{\frac{\hat{\rho}_{11}}{\hat{\rho}_{44}}} \quad (77)$$

If $\bar{n}_1 = \bar{n}_2$ is established, required results may be obtained through the contaminations.

The aforementioned WM may be generalized into von Meumann measurement. If the measurement strength mi is 1, WM is associated with positive-operator value measurement.

A success probability is described below. As the WM intensity $m_1$ and/or $m_2$ increases, the concurrence is improved according to a decrease success probability Ps given as Equation 78.

$$P_s = N\prod_{i=1}^{2}\min\left\{1, \frac{1}{\bar{m}_i^2}\right\}\min\left\{1, \frac{1}{\bar{n}_i^2}\right\} \quad (78)$$

Figure 16:
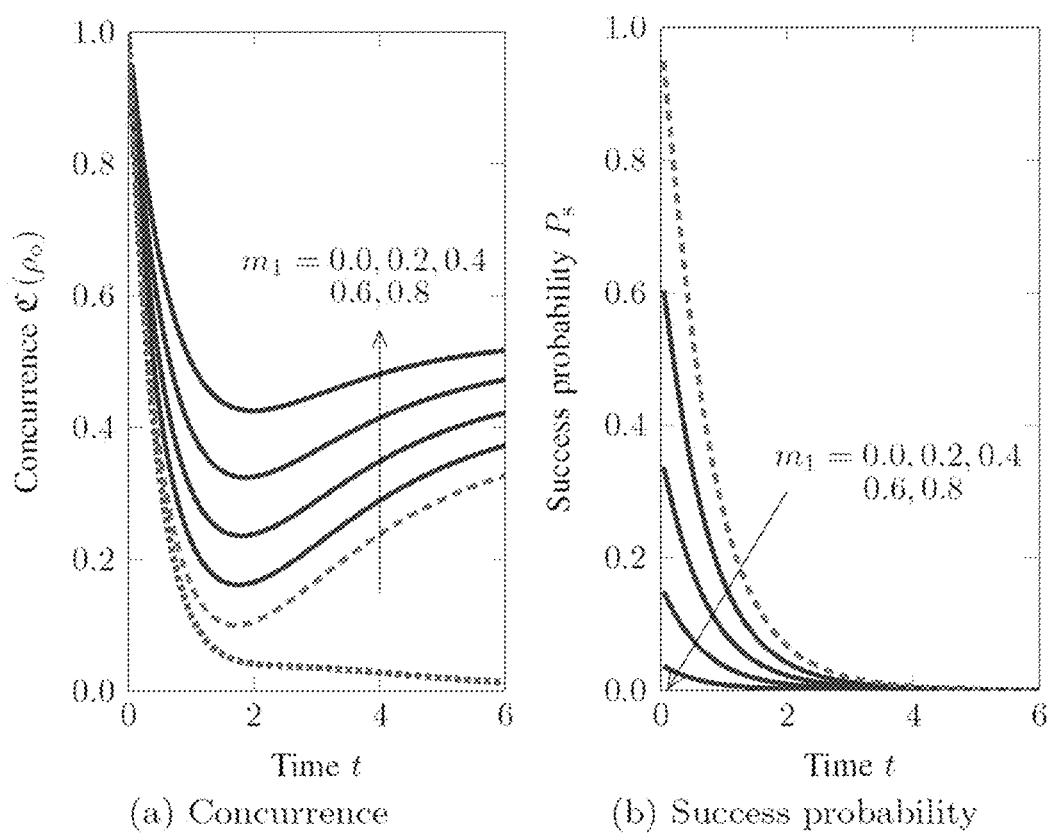
FIG. 16 shows concurrence and a success probability Ps as the function of the time t according to an embodiment of the present invention.

In Equation 78, the success probability for a full reversal procedure is 0. Concurrence using quantum state protection is described below. FIG. 16 shows concurrence and a success probability Ps as the function of the time t according to an embodiment of the present invention. Specifically, the concurrence and the success probability Ps are shown as the function of t in (1, 1, −1, 0.3). In Equation 16, a green dotted line indicates TCMQC if WM and QWR are not present. A red dash line indicates optimal QMR if WM is not present. A blue line indicates optimal QMR if WM is not present. As shown, it may be seen that entanglement can be successfully restored to the WM and QMR measurement strength by sacrificing the success probability. Furthermore, it may be seen that as ω increases, entanglement improvement for the WM and QMR is decreased. It may be seen that such a quantum state protecting scheme well operates in a dissipative environment.

Figure 17:
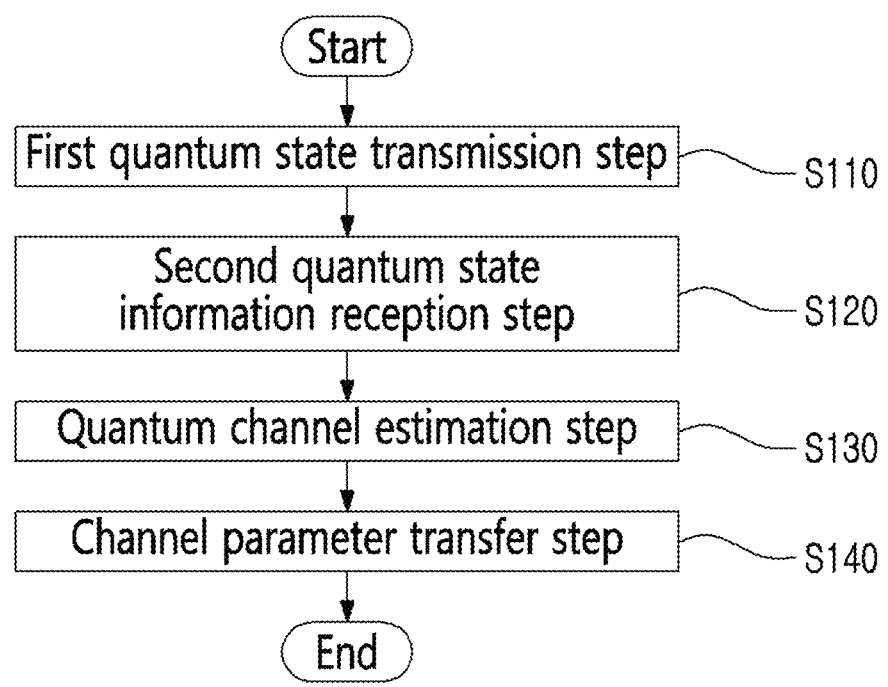
FIG. 17 is a flowchart of a quantum channel estimation method performed by a first device, that is, a transmission device, according to an embodiment of the present invention.
Figure 18:
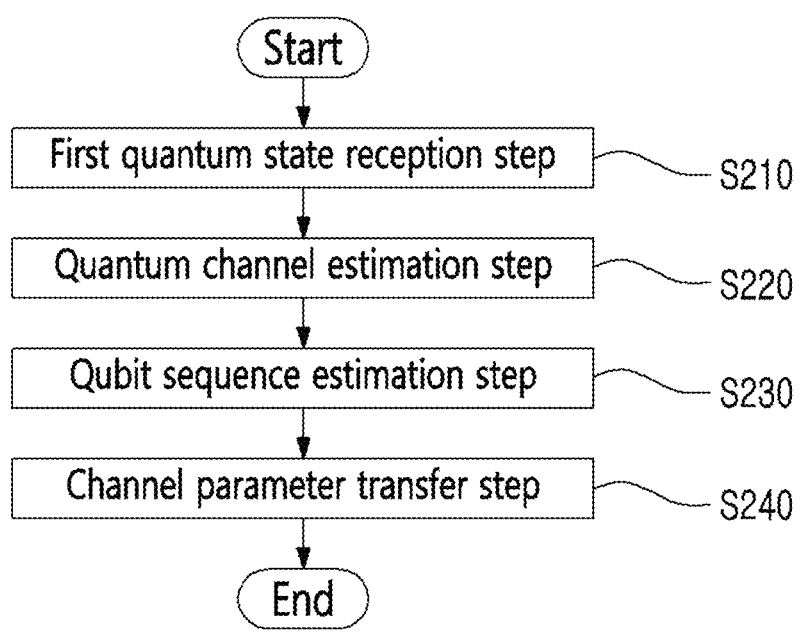
FIG. 18 is a flowchart of a quantum channel estimation method performed by a second device, that is, a reception device, according to an embodiment of the present invention.

A quantum channel estimation method according to another aspect of the present invention is described below based on the aforementioned contents. FIG. 17 is a flowchart of a quantum channel estimation method performed by the first device, that is, a transmission device, according to an embodiment of the present invention. FIG. 18 is a flowchart of a quantum channel estimation method performed by the second device, that is, a reception device, according to an embodiment of the present invention. The contents described in the quantum channel estimation system may be combined with a quantum channel conversion method to be described below.

Referring to FIG. 17, the quantum channel estimation method includes a first quantum state transmission step S110, a second quantum state information reception step S120, a quantum channel estimation step S130, and a channel parameter transfer step S140.

In the first quantum state transmission step S110, a first quantum state ρ including an N-qubit sequence is transmitted to the second device, that is, the reception device, through a quantum channel. Furthermore, in the second quantum state information reception step S120, information about a second quantum state Φ(ρ) received by the second device is received from the second device through the quantum channel. In this case, the information about the second quantum state Φ(ρ) may be the second quantum state Φ(ρ) itself or some information (parameter).

In the quantum channel estimation step S130, a quantum channel is estimated based on the received information about the second quantum state Φ(ρ). In this case, the second quantum state Φ(ρ) is determined to be $$\Phi(\rho) = (1-\mu)\sum_{i,j} A_{ij}^u \rho A_{ij}^{u\dagger} + \mu \sum_k A_k^c \rho A_k^{c\dagger}.$$

In this case, $A_{ij}^u = A_i \otimes A_j$ is a first Kraus operator not having a correlation, and $A_k^c$ is a second Kraus operator having a correlation. In the quantum channel estimation step S130, the second Kraus operator may be estimated.

Figure 19:
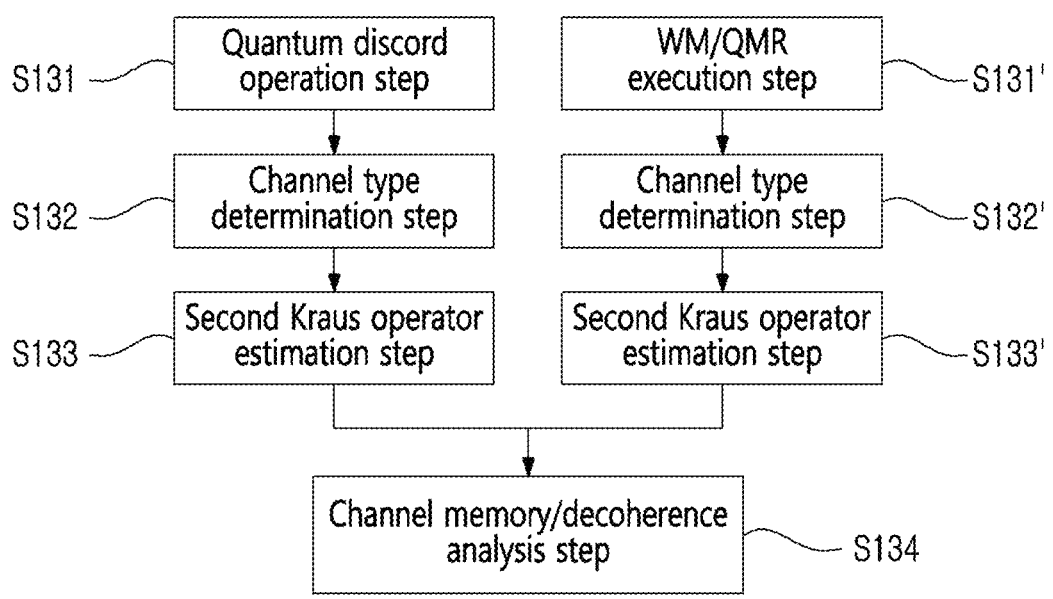
FIGS. 19 and 20 show detailed flowchart of the method according to embodiments of the present invention.

FIG. 19 is a detailed flowchart of the method according to embodiments of the present invention. As shown on the left side of FIG. 19, the quantum channel estimation step S130 may include a quantum discord operation step S131, a channel type determination step S132, and a second Kraus operator estimation step S133. Alternatively, as shown in on the right side of FIG. 19, the quantum channel estimation step S130 may include a WM/QMR execution step S131', a channel type determination step S132', and a second Kraus operator estimation step S133'. Furthermore, the quantum channel estimation step S130 may further include a channel memory/decoherence analysis step S134. In this case, the channel memory/decoherence analysis step S134 may be performed by omitting some of the aforementioned steps or may be performed independently of the aforementioned steps.

In the quantum discord operation step S131, quantum discord operation is performed on the second quantum state Φ(ρ) according to a change of time. In the channel type determination step S132, whether the quantum channel corresponds to which one of a phase damping channel, an amplitude damping channel, and a thermal field channel having specific channel memory is determined based on the quantum discord. In the second Kraus operator estimation step S133, the second Kraus operator is estimated using a different method based on the determined channel.

In the WM/QMR execution step S131', at least one of weak measurement (WM) and quantum measurement reversal (QMR) is performed on the second quantum state Φ(ρ). In the channel type determination step S132', whether the quantum channel corresponds to which one of a phase damping channel, an amplitude damping channel, and a thermal field channel having specific channel memory is determined based on at least one of the WM and the QMR. In the second Kraus operator estimation step S133', the second Kraus operator is estimated based on the concurrence of the second quantum state Φ(ρ) according to measurement strength associated with the WM/QMR and a change of time. In this case, the type of determined channel may be taken into consideration.

In the channel memory/decoherence analysis step S134, a channel memory and decoherence effect between the two consecutive uses of the channel derived by a time-correlated Markov quantum channel (TCMQC) is analyzed.

In the channel parameter transfer step S140, a parameter for the second Kraus operator is transferred to the second device based on the estimated quantum channel. In this case, the second device 200 may estimate an N-qubit sequence based on the received parameter for the second Kraus operator and the second quantum state Φ(ρ).

Referring to FIG. 18, the quantum channel estimation method includes a first quantum state reception step S210, a quantum channel estimation step S220, a qubit sequence estimation step S230, and a channel parameter transfer step S240. The sequence of the aforementioned steps may be changed depending on the application. For example, the channel parameter transfer step S240 may be performed prior to the qubit sequence estimation step S230, but the present invention is not limited thereto and the sequence may be freely changed.

In the first quantum state reception step S210, a first quantum state ρ including an N-qubit sequence is received from the first device, that is, a transmission device, through a quantum channel. In this case, the first quantum state ρ may be received as a second quantum state Φ(ρ) through the quantum channel. In the quantum channel estimation step S220, the quantum channel is estimated based on the received second quantum state Φ(ρ). In this case, the second quantum state Φ(ρ) is determined to be $$\Phi(\rho) = (1-\mu)\sum_{i,j} A_{ij}^u \rho A_{ij}^{u\dagger} + \mu \sum_k A_k^c \rho A_k^{c\dagger}.$$

In this case, $A_{ij}^u = A_i \otimes A_j$ is a first Kraus operator not having a correlation, and $A_k^c$ is a second Kraus operator having a correlation. In the quantum channel estimation step S120, the second Kraus operator may be estimated.

Figure 20:
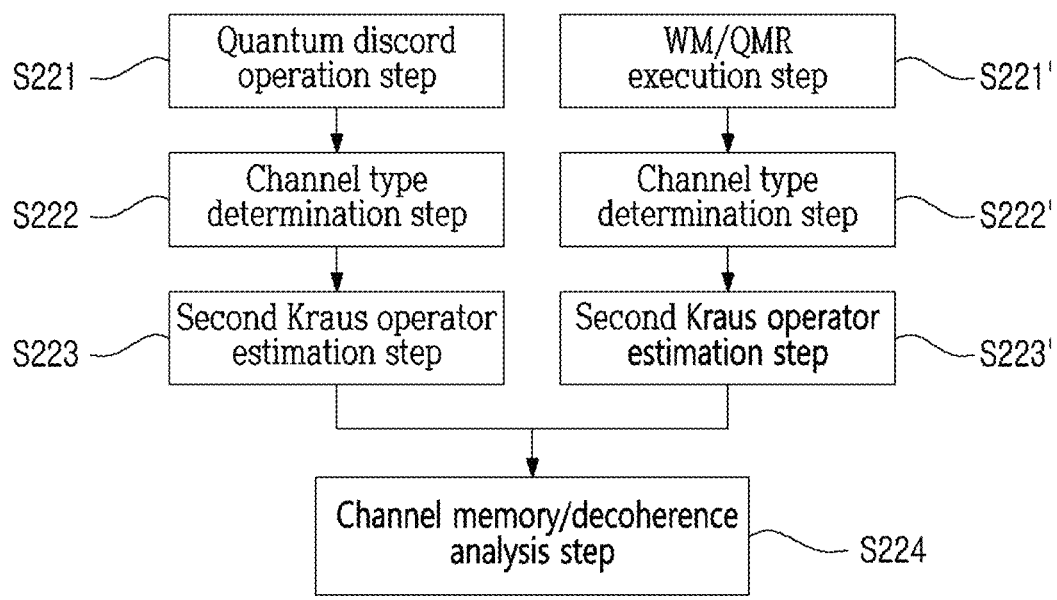

FIG. 20 is a detailed flowchart of the quantum channel estimation method according to an embodiment of the present invention. As shown in on the left side of FIG. 20, the quantum channel estimation step S220 may include a quantum discord operation step S221, a channel type determination step S222, and a second Kraus operator estimation step S223. Alternatively, as shown in on the right side of FIG. 20, the quantum channel estimation step S130 may include a WM/QMR execution step S221', a channel type determination step S222', and a second Kraus operator estimation step S223'. Furthermore, the quantum channel estimation step S130 may further include a channel memory/decoherence analysis step S224. In this case, the channel memory/decoherence analysis step S224 may be performed by omitting some of the aforementioned steps or may be performed independently of the aforementioned steps.

In the quantum discord operation step S221, quantum discord operation is performed on a second quantum state Φ(ρ) according to a change of time. In the channel type determination step S222, whether the quantum channel corresponds to any one of a phase damping channel, an amplitude damping channel, and a thermal field channel having specific channel memory is determined based on the quantum discord. In the second Kraus operator estimation step S223, the second Kraus operator is estimated using a different method depending on the determined channel.

In the WM/QMR execution step S221', at least one of weak measurement (WM) and quantum measurement reversal (QMR) is performed on the second quantum state $\Phi(\rho)$. In the channel type determination step S222', whether the quantum channel corresponds to any one of a phase damping channel, an amplitude damping channel, and a thermal field channel having specific channel memory may be determined based on based on the WM/QMR. In the second Kraus operator estimation step S223', the second Kraus operator may be estimated based on the concurrence of the second quantum state $\Phi(\rho)$ according to measurement strength associated with the WM/QMR and a change of time. In this case, the type of determined channel may be taken into consideration.

In the channel memory/decoherence analysis step S224, a channel memory and decoherence effect between the two consecutive uses of the channel derived by a time-correlated Markov quantum channel (TCMQC) may be analyzed.

In the qubit sequence estimation step S230, an N-qubit sequence may be estimated based on a parameter for the second Kraus operator and the second quantum state $\Phi(\rho)$. In the channel parameter transfer step S240, the parameter for the second Kraus operator may be transferred to the first device based on the estimated quantum channel.

In the embodiments of the present invention, the dynamics of quantum nonlinearity of the TCMQC have been reviewed. The proposed TCMQC may be specified by the composite decay effect derived by the pumping, virtual process, and decoherence, such as non-spontaneous emission. Such a model may include a plurality of Markovian quantum channel models and may be formed by a specific degree of the channel memory effect. Furthermore, a framework for specifying the dynamics of quantum nonlinearity between qubits may be constructed as a time-varying function. Furthermore, a quantum correlation between qubits can be improved using the WM and QMR schemes having proper measurement strength.

In accordance with at least one embodiment of the present invention, there is an advantage in that an accurate method of estimating a quantum channel according to a change of time can be provided using the quantum correlation property of the quantum state.

Furthermore, in accordance with at least one embodiment of the present invention, there is an advantage in that the best quantum channel estimation method according to several parameters for a quantum state can be provided in order to provide the accurate method of estimating a quantum channel according to a change of time using a different quantum correlation property for each channel type.

In accordance with a software implementation, the elements in addition to the procedures and functions described in this specification may be implemented using separate software modules. Each of the software modules may perform one or more functions and operations described in this specification. Software code may be implemented by a software application written in a proper program language. The software code may be stored in the memory and executed by a controller or a processor.

The invention claimed is:

1. A method of performing quantum channel estimation, wherein the method is performed by a first device of a transmission device and comprises:

transmitting, by the first device comprising a processor, a first quantum state $\rho$ comprising an N-qubit sequence to a second device of a reception device through a quantum channel;

receiving, by the second device comprising a processor, information about a second quantum state $\Phi(\rho)$ received by the second device through the quantum channel from the second device;

estimating, by the processor of the first device, the quantum channel based on the received information about the second quantum state $\Phi(\rho)$; and transmitting, by the first device, data to the second device, by using the estimated quantum channel.

2. The method of claim 1, wherein:

the second quantum state $\Phi(\rho)$ is determined to be $$\Phi(\rho) = (1-\mu)\sum_{i,j} A_{ij}^{u}\rho A_{ij}^{u\dagger} + \mu\sum_{k} A_{k}^{c}\rho A_{k}^{c\dagger},$$

wherein $A_{ij}^{u}=A_i \otimes A_j$ is a first Kraus operator not having a correlation and $A_k^{c}$ is a second Kraus operator having a correlation, and the estimating comprises estimating the second Kraus operator.

3. The method of claim 2, wherein the estimating comprises:

performing quantum discord operation on the second quantum state $\Phi(\rho)$ according to a change of time;

determining whether the quantum channel corresponds to any one of a phase damping channel, an amplitude damping channel, and a thermal field channel having specific channel memory based on the quantum discord; and estimating the second Kraus operator using a different method depending on the determined channel.

4. The method of claim 2, wherein the estimating comprises:

performing at least one of weak measurement (WM) and quantum measurement reversal (QMR) on the second quantum state $\Phi(\rho)$; and estimating the second Kraus operator based on a concurrence of the second quantum state $\Phi(\rho)$ according to measurement strength associated with the WM/QMR and a change of time.

5. The method of claim 3, wherein the estimating further comprises analyzing a channel memory and decoherence effect between two consecutive uses of the channel derived by a time-correlated Markov quantum channel (TCMQC).

6. The method of claim 2, further comprising:

transferring a parameter for the second Kraus operator to the second device based on the estimated quantum channel, wherein the second device estimates the N-qubit sequence based on the parameter for the second Kraus operator and the second quantum state $\Phi(\rho)$.

7. A method of performing quantum channel estimation, wherein the method is performed by a second device of a reception device and comprises:

receiving, by the second device comprising a processor, a first quantum state $\rho$ comprising an N-qubit sequence from a first device of a transmission device through a quantum channel, wherein the first quantum state $\rho$ is received as a second quantum state $\Phi(\rho)$ through the quantum channel;

estimating, by the processor of the second device, the
quantum channel based on the received second quantum state $\Phi(\rho)$; and transmitting, by the second device, data to the first device, by using the estimated quantum channel.

8. The method of claim 7, wherein:
the second quantum state $\Phi(\rho)$ is determined to be $$\Phi(\rho) = (1-\mu)\sum_{i,j} A^u_{ij} \rho A^{u\dagger}_{ij} + \mu \sum_k A^c_k \rho A^{c\dagger}_k,$$

wherein $A_{ij}{}^u = A_i \otimes A_j$ is a first Kraus operator not having a correlation and $A_k{}^c$ is a second Kraus operator having a correlation, and the estimating comprises estimating the second Kraus operator.

9. The method of claim 8, wherein the estimating comprises:
performing quantum discord operation on the second quantum state $\Phi(\rho)$ according to a change of time;
determining whether the quantum channel corresponds to any one of a phase damping channel, an amplitude damping channel, and a thermal field channel having specific channel memory based on the quantum discord; and
estimating the second Kraus operator using a different method depending on the determined channel.

10. The method of claim 8, wherein the estimating comprises:
performing at least one of weak measurement (WM) and quantum measurement reversal (QMR) on the second quantum state $\Phi(\rho)$; and
estimating the second Kraus operator based on a concurrence of the second quantum state $\Phi(\rho)$ according to measurement strength associated with the WM/QMR and a change of time.

11. The method of claim 9, wherein the estimating further comprises analyzing a channel memory and decoherence effect between two consecutive uses of the channel derived by a time-correlated Markov quantum channel (TCMQC).

12. The method of claim 8, further comprising:
estimating the N-qubit sequence based on a parameter for the second Kraus operator and the second quantum state $\Phi(\rho)$; and
transferring the parameter for the second Kraus operator to the first device based on the estimated quantum channel.

13. A quantum transmission device performing quantum channel estimation, comprising:
a transceiver configured to transmit a first quantum state $\rho$ comprising an N-qubit sequence to a second device of a reception device through a quantum channel and receive information about a second quantum state $\Phi(\rho)$ received by the second device through the quantum channel from the second device; and
a processor configured to
estimate the quantum channel based on the received information about the second quantum state $\Phi(\rho)$, and
transmit data, by the quantum transmission device, to the second device, by using the estimated quantum channel.

14. The quantum transmission device of claim 13, wherein:
the second quantum state $\Phi(\rho)$ is determined to be $$\Phi(\rho) = (1-\mu)\sum_{i,j} A^u_{ij} \rho A^{u\dagger}_{ij} + \mu \sum_k A^c_k \rho A^{c\dagger}_k,$$

wherein $A_{ij}{}^u = A_i \otimes A_j$ is a first Kraus operator not having a correlation and $A_k{}^c$ is a second Kraus operator having a correlation, and the processor is configured to estimate the second Kraus operator.

15. The quantum transmission device of claim 14, wherein the processor is configured to:
perform quantum discord operation on the second quantum state $\Phi(\rho)$ according to a change of time,
determine whether the quantum channel corresponds to any one of a phase damping channel, an amplitude damping channel, and a thermal field channel having specific channel memory based on the quantum discord, and
estimate the second Kraus operator using a different method depending on the determined channel.

16. The quantum transmission device of claim 14, wherein the processor is configured to:
perform at least one of weak measurement (WM) and quantum measurement reversal (QMR) on the second quantum state $\Phi(\rho)$, and
estimate the second Kraus operator based on a concurrence of the second quantum state $\Phi(\rho)$ according to measurement strength associated with the WM/QMR and a change of time.

17. A quantum reception device performing quantum channel estimation, comprising:
a transceiver configured to receive a first quantum state $\rho$ comprising an N-qubit sequence from a first device of a transmission device through a quantum channel, wherein the first quantum state $\rho$ is received as a second quantum state $\Phi(\rho)$ through the quantum channel; and
a processor configured to
estimate the quantum channel based on the received second quantum state $\Phi(\rho)$, and
transmit data, by the quantum reception device, to the first device, by using the estimated quantum channel.

18. The quantum reception device of claim 17, wherein:
the second quantum state $\Phi(\rho)$ is determined to be $$\Phi(\rho) = (1-\mu)\sum_{i,j} A^u_{ij} \rho A^{u\dagger}_{ij} + \mu \sum_k A^c_k \rho A^{c\dagger}_k,$$

wherein $A_{ij}{}^u = A_i \otimes A_j$ is a first Kraus operator not having a correlation and $A_k{}^c$ is a second Kraus operator having a correlation, and the processor is configured to estimate the second Kraus operator.

19. The quantum reception device of claim 17, wherein the processor is configured to analyze a channel memory and decoherence effect between two consecutive uses of the channel derived by a time-correlated Markov quantum channel (TCMQC).

20. The quantum reception device of claim 18, wherein the processor is configured to:
estimate the N-qubit sequence based on a parameter for the second Kraus operator and the second quantum state $\Phi(\rho)$, and transfer the parameter for the second Kraus operator to the first device based on the estimated quantum channel.

\* \* \* \* \*